(12) United States Patent
Tanaka et al.

(10) Patent No.: US 11,700,622 B2
(45) Date of Patent: Jul. 11, 2023

(54) COMMUNICATION APPARATUS AND COMMUNICATION METHOD

(71) Applicant: SONY CORPORATION, Tokyo (JP)

(72) Inventors: Yusuke Tanaka, Tokyo (JP); Yuichi Morioka, Tokyo (JP); Hiroshi Shigeno, Kanagawa (JP); Takanobu Ohnuma, Kanagawa (JP); Koki Iwai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 17/052,803

(22) PCT Filed: May 7, 2019

(86) PCT No.: PCT/JP2019/018208
§ 371 (c)(1),
(2) Date: Nov. 3, 2020

(87) PCT Pub. No.: WO2019/220943
PCT Pub. Date: Nov. 21, 2019

(65) Prior Publication Data
US 2021/0250942 A1 Aug. 12, 2021

(30) Foreign Application Priority Data
May 15, 2018 (JP) .................. 2018-093820

(51) Int. Cl.
*H04W 72/04* (2023.01)
*H04W 24/02* (2009.01)
(Continued)

(52) U.S. Cl.
CPC ........... *H04W 72/27* (2023.01); *H04W 24/02* (2013.01); *H04W 52/18* (2013.01);
(Continued)

(58) Field of Classification Search
CPC . H04W 72/0426; H04W 24/02; H04W 52/18; H04W 72/0473; H04W 84/12; H04W 92/20
(Continued)

(56) References Cited

U.S. PATENT DOCUMENTS

2008/0056177 A1 3/2008 Mori et al.
2011/0294514 A1 12/2011 Kulkarni
(Continued)

FOREIGN PATENT DOCUMENTS

CA 2834912 A1 11/2012
CN 101136821 A 3/2008
(Continued)

OTHER PUBLICATIONS

International Search Report and Written Opinion of PCT Application No. PCT/JP2019/018208, dated Jul. 2, 2019, 13 pages of ISRWO.

(Continued)

*Primary Examiner* — Gbemileke J Onamuti
(74) *Attorney, Agent, or Firm* — Chip Law Group

(57) ABSTRACT

The present technology relates to a communication apparatus and a communication method that can improve a communication characteristic. The communication apparatus is a base station and includes a control section configured to determine, on the basis of first communication situation information regarding a communication situation of the base station and second communication situation information regarding a communication situation received from another base station, whether or not it is permissible to carry out control of a communication parameter in the base station, and determine, on the basis of the first communication situation information and the second communication situation information, whether or not it is permissible to transmit (Continued)

first control request information regarding a control request of a communication parameter in the other base station. The present technology can be applied, for example, to a wireless LAN system.

19 Claims, 14 Drawing Sheets

(51) Int. Cl.
  *H04W 52/18* (2009.01)
  *H04W 72/27* (2023.01)
  *H04W 72/044* (2023.01)
  *H04W 84/12* (2009.01)
  *H04W 92/20* (2009.01)

(52) U.S. Cl.
  CPC ........ *H04W 72/0473* (2013.01); *H04W 84/12* (2013.01); *H04W 92/20* (2013.01)

(58) Field of Classification Search
  USPC .......................................... 370/329
  See application file for complete search history.

(56) References Cited

U.S. PATENT DOCUMENTS

| | | |
|---|---|---|
| 2013/0003590 A1 | 1/2013 | Gage et al. |
| 2015/0359008 A1 | 12/2015 | Wang et al. |
| 2016/0262163 A1 | 9/2016 | Gonzalez Garrido et al. |
| 2018/0242373 A1 | 8/2018 | Wang et al. |
| 2021/0014906 A1 | 1/2021 | Wang et al. |

FOREIGN PATENT DOCUMENTS

| | | |
|---|---|---|
| CN | 103650579 A | 3/2014 |
| EP | 1895714 A1 | 3/2008 |
| EP | 2708061 A1 | 3/2014 |
| EP | 2944140 A1 | 11/2015 |
| EP | 3059992 A1 | 8/2016 |
| EP | 3301983 A1 | 4/2018 |
| EP | 3709729 A1 | 9/2020 |
| ES | 2458621 A1 | 5/2014 |
| JP | 2008-060994 A | 3/2008 |
| JP | 2011-259424 A | 12/2011 |
| JP | 2016-507183 A | 3/2016 |
| JP | 2016-134821 A | 7/2016 |
| JP | 6437923 B2 | 12/2018 |
| TW | 201436610 A | 9/2014 |
| WO | 2012/151656 A1 | 11/2012 |
| WO | 2014/110397 A1 | 7/2014 |
| WO | 2015/055871 A1 | 4/2015 |

OTHER PUBLICATIONS

Extended European Search Report of EP Application No. 19802957.1, dated Jan. 25, 2022, 09 pages.

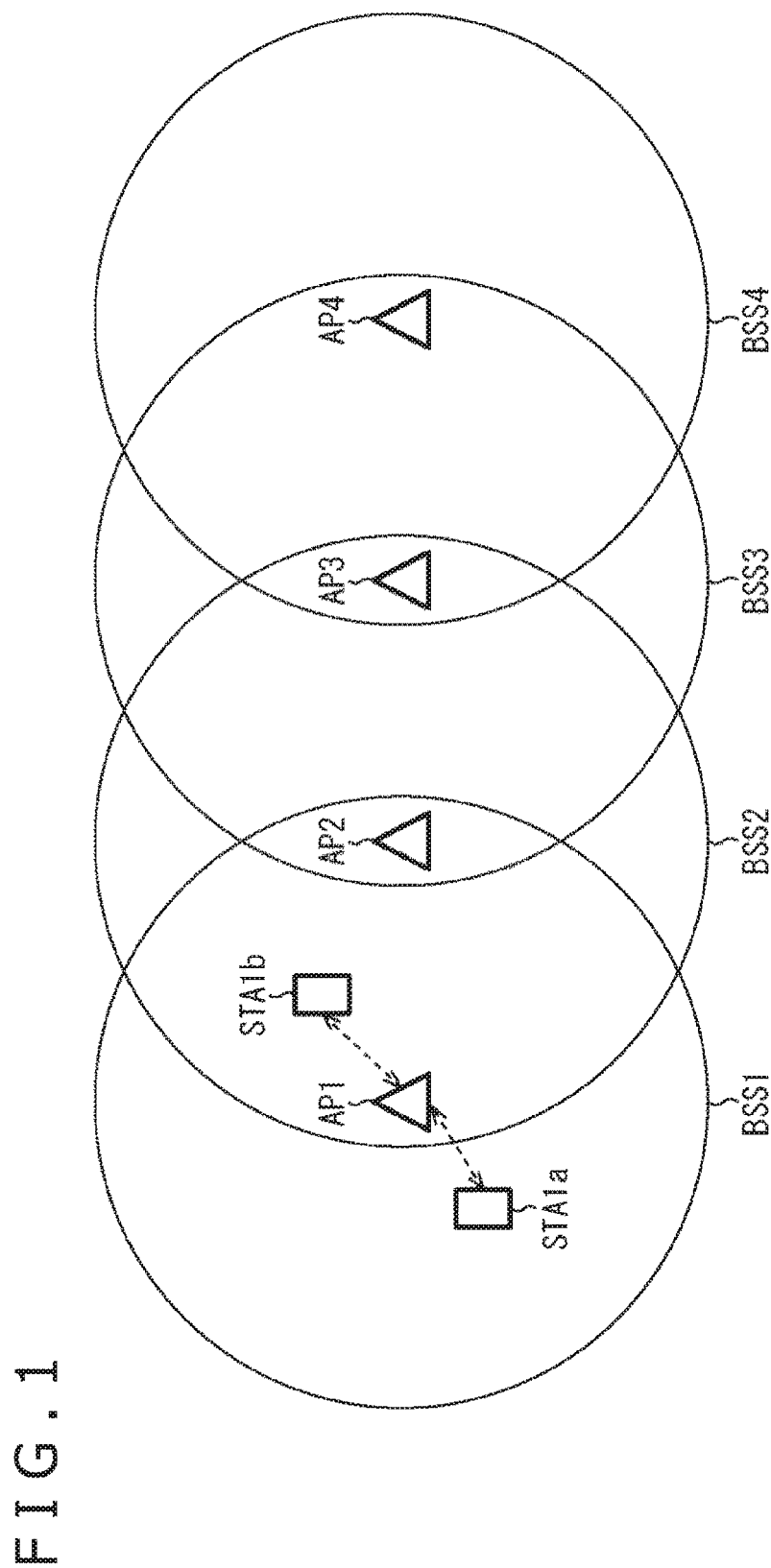
F I G . 1

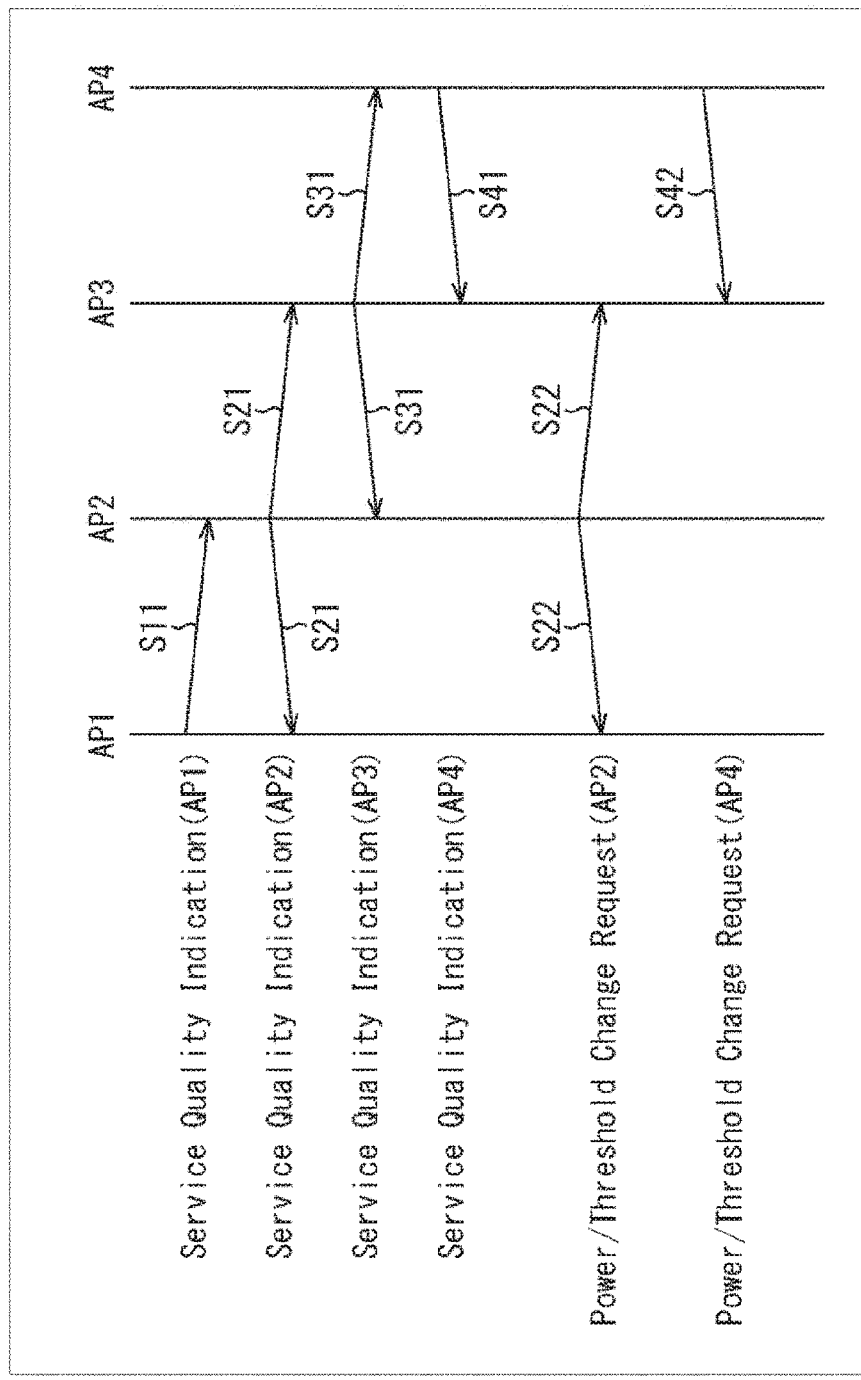
F I G. 4

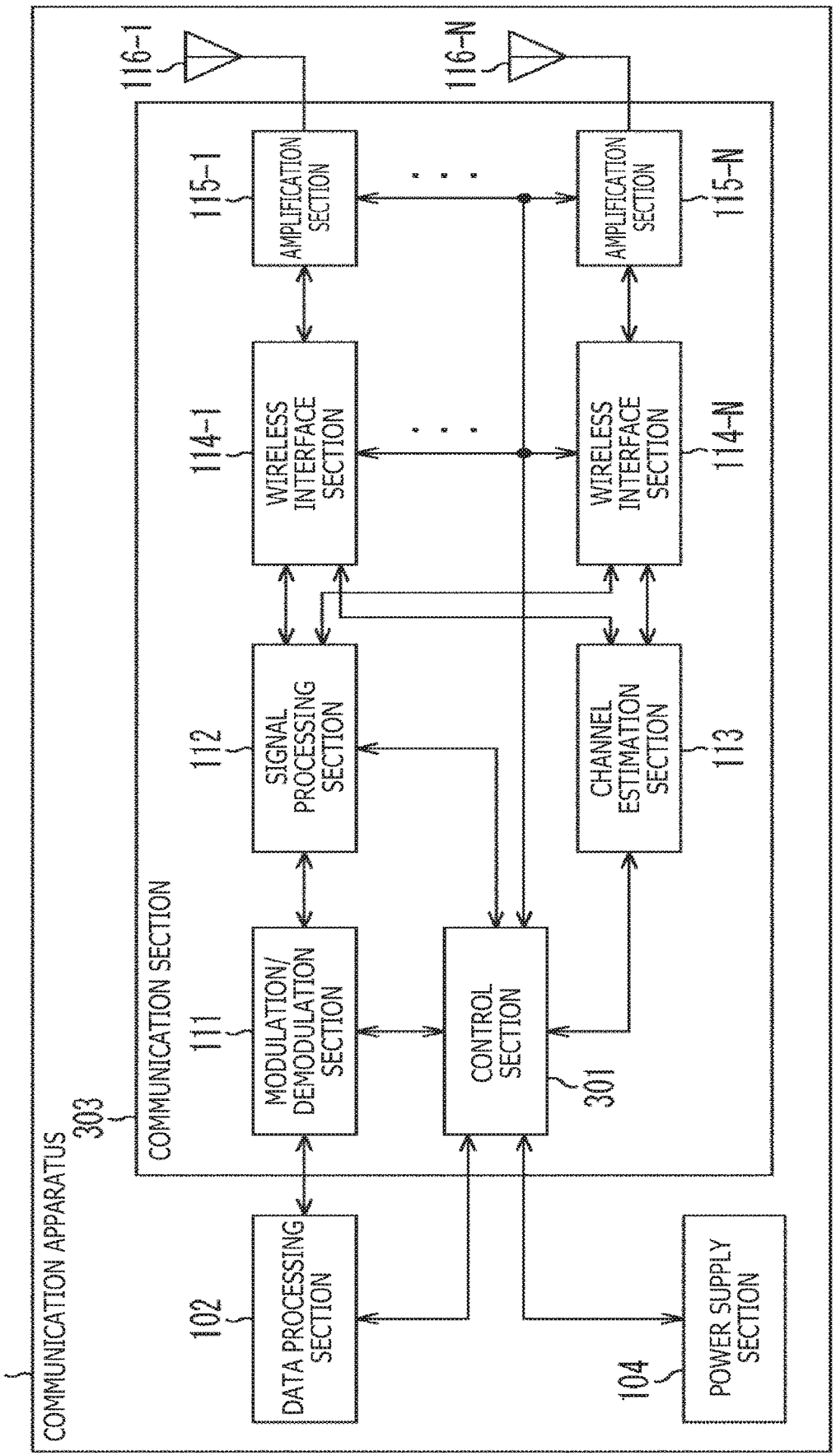

COMMUNICATION APPARATUS AND COMMUNICATION METHOD

CROSS REFERENCE TO RELATED APPLICATIONS

This application is a U.S. National Phase of International Patent Application No. PCT/JP2019/018208 filed on May 7, 2019, which claims priority benefit of Japanese Patent Application No. JP 2018-093820 filed in the Japan Patent Office on May 15, 2018. Each of the above-referenced applications is hereby incorporated herein by reference in its entirety.

TECHNICAL FIELD

The present technology relates to a communication apparatus and a communication method, and particularly relates to a communication apparatus and a communication method that can improve a communication characteristic.

BACKGROUND ART

In recent years, together with widespread of a wireless LAN (Local Area Network) system, mutual interference between networks by densification of equipment equipped with a wireless LAN is a problem. Since the mutual interference gives rise to such problems as loss of communication opportunities of equipment equipped with a wireless LAN and deterioration of the communication quality, various technologies are proposed.

For example, PTL 1 discloses that, in the case where a network confirms, on the basis of information obtained by observation by an access point (AP: Access Point) configuring the network and a station (STA: Station) under the access point, presence of other networks therearound and all of the other networks have a function for transmission power control, the access point controls transmission power of the access point itself and the station such that a specific condition is satisfied.

CITATION LIST

Patent Literature

PTL 1
JP 2008-60994A

SUMMARY

Technical Problem

However, from the point of view of improvement of a communication characteristic that maintains impartiality with adjacent networks and improvement of a communication characteristic of the entire network associated with this, it is not considered that, even if the technology disclosed in PTL 1 is used, sufficient improvement cannot be achieved, and a technology for improving a communication characteristic is demanded.

The present technology has been made in view of such a situation as just described above and makes it possible to improve a communication characteristic.

Solution to Problem

The communication apparatus of a first aspect of the present technology is a communication apparatus that is a base station, the communication apparatus including a control section configured to determine, on the basis of first communication situation information regarding a communication situation of the base station and second communication situation information regarding a communication situation received from another base station, whether or not it is permissible to carry out control of a communication parameter in the base station, and determine, on the basis of the first communication situation information and the second communication situation information, whether or not it is permissible to transmit first control request information regarding a control request of a communication parameter in the another base station.

The communication method of the first aspect of the present technology is a communication method performed by a communication apparatus of a base station, the communication method including determining, on the basis of first communication situation information regarding a communication situation of the base station and second communication situation information regarding a communication situation received from another base station, whether or not it is permissible to carry out control of a communication parameter in the base station, and determining, on the basis of the first communication situation information and the second communication situation information, whether or not it is permissible to transmit first control request information regarding a control request of a communication parameter in the another base station.

In the communication apparatus and the communication method of the first aspect of the present technology, it is determined, on the basis of first communication situation information regarding a communication situation of the base station and second communication situation information regarding a communication situation received from the another base station, whether or not it is permissible to carry out control of a communication parameter in the base station. Then, it is determined, on the basis of the first communication situation information and the second communication situation information, whether or not it is permissible to transmit first control request information regarding a control request of a communication parameter in the another base station.

The communication apparatus of a second aspect of the present technology is a communication apparatus that is a subordinate terminal connected to a base station, the communication apparatus including a control section that carries out control of a communication parameter of the subordinate terminal on the basis of control request information regarding a control request of a communication parameter in the base station received from the base station. The control request information is information based on first communication situation information regarding a communication situation of the base station and second communication situation information regarding a communication situation of another base station.

The communication method of the second aspect of the present technology is a communication method performed by a communication apparatus of a subordinate terminal connected to a base station, the communication method including carrying out control of a communication parameter of the subordinate terminal on the basis of control request information that is information regarding a control request of a communication parameter in the base station received from the base station and is based on first communication situation information regarding a communication situation of the base station and second communication situation information regarding a communication situation in another base station.

In the communication apparatus and the communication method of the second aspect of the present technology, control of a communication parameter in the subordinate terminal is carried out on the basis of control request information that is information regarding a control request of a communication parameter in the base station received from the base station connected to the subordinate terminal and is based on first communication situation information regarding a communication situation of the base station and second communication situation information regarding a communication situation of the another base station.

It is to be noted that each of the communication apparatus of the first aspect and the second aspect of the present technology may be an independent apparatus or may be an internal block that configures one apparatus.

Advantageous Effect of Invention

According to the first aspect and the second aspect of the present technology, a communication characteristic can be improved.

It is to be noted that the effect described here is not necessarily restrictive, and some other effect described in the present disclosure may be applicable.

BRIEF DESCRIPTION OF DRAWINGS

FIG. 1 is a view depicting an example of a configuration of a wireless communication system.

FIG. 4 is a sequence diagram depicting a second example of impartial cooperation.

FIG. 14 is a block diagram depicting another example of another configuration of the embodiment of the communication apparatus to which the present technology is applied.

DESCRIPTION OF EMBODIMENT

In the following, an embodiment of the present disclosure is described with reference to the drawings. It is to be noted that the description is given in the following order.

1. Embodiment of Present Technology
2. Modification

1. Embodiment of Present Technology (Example of Configuration of Wireless Communication System)

FIG. 1 is a view depicting an example of a configuration of a wireless communication system.

In FIG. 1, the wireless communication system is a system of a wireless LAN (Local Area Network) including a plurality of networks (BSS: Basic Service Set) each including a base station (AP: Access Point) and a subordinate terminal (STA: Station) connected to the base station.

A base station AP1 and a subordinate terminal STA1$a$ and another subordinate terminal STA1$b$ connected to the base station AP1 configure a network BSS1. It is to be noted that broken lines connecting the base station AP1 and the subordinate terminal STA1$a$ and the subordinate terminal STA1$b$ indicate that they are connected to each other. Further, though not depicted, also to each of a base station AP2 to a base station AP4, subordinate terminals STA are connected similarly to the base station AP1 to configure networks BSS2 to BSS4, respectively.

A circle of a solid line centered at each base station AP indicates a communication range of each base station AP, namely, a signal reaching range and a signal detection range. The communication ranges of the respective base stations AP sometimes overlap with each other. For example, in FIG. 1, the communication range of the base station AP2 includes the base station AP1 and the base station AP3.

It is to be noted that the configuration of the wireless communication system depicted in FIG. 1 is exemplary, and the number and the deployment of the base stations AP, the subordinate terminals STA, and the networks BSS are not restricted to those of the wireless communication system.

(Example of Configuration of Communication Apparatus)

Figure 2:
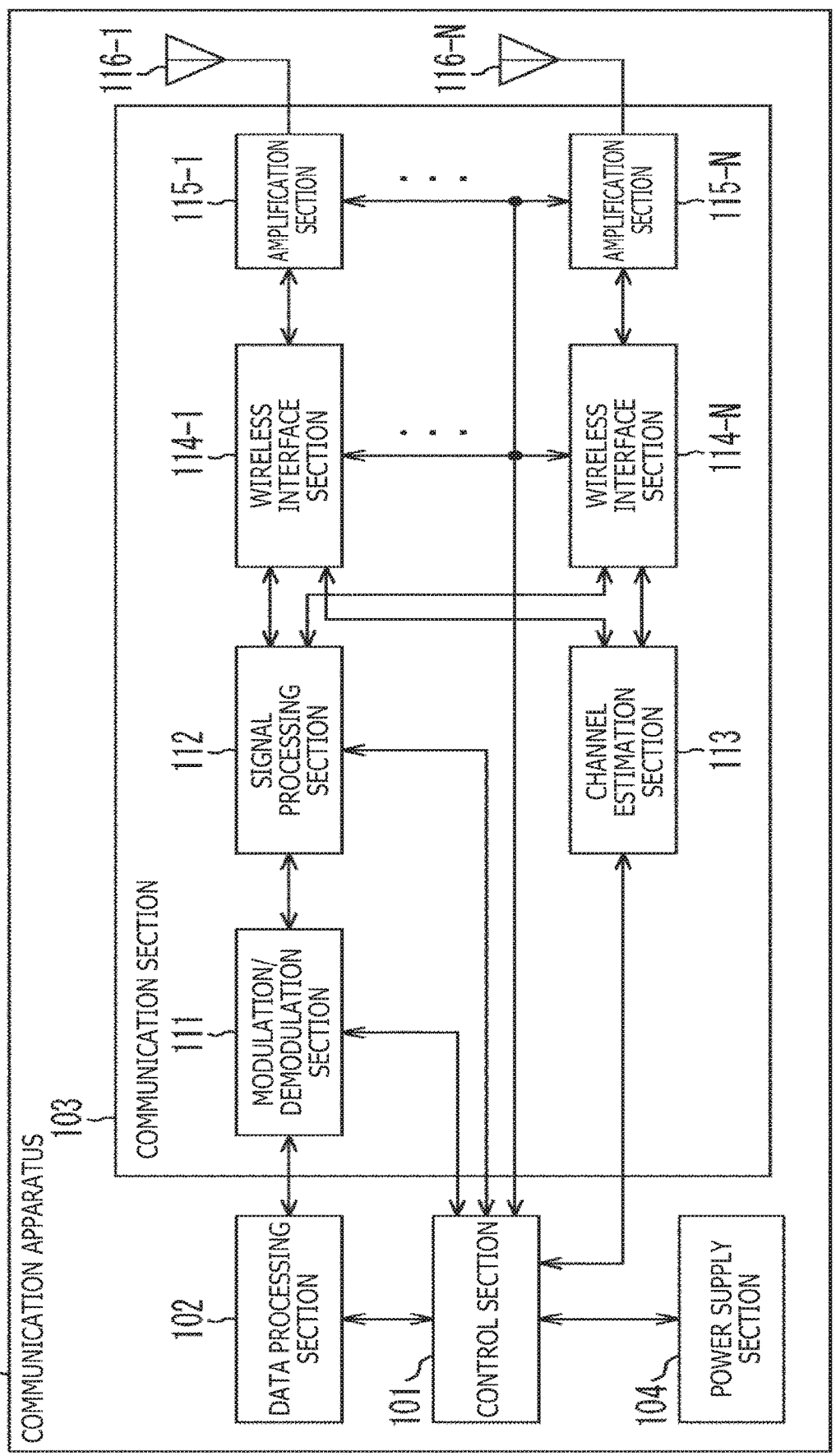
FIG. 2 is a block diagram depicting an example of a configuration of an embodiment of a communication apparatus to which the present technology is applied.

FIG. 2 is a block diagram depicting an example of a configuration of an embodiment of a communication apparatus (wireless communication apparatus) to which the present technology is applied.

A communication apparatus 10 depicted in FIG. 2 is configured as the base station AP or the subordinate terminal STA in the wireless communication system of FIG. 1.

In FIG. 2, the communication apparatus 10 includes a control section 101, a data processing section 102, a communication section 103, and a power supply section 104. In addition, the communication section 103 includes a modulation/demodulation section 111, a signal processing section 112, a channel estimation section 113, wireless interface sections 114-1 to 114-N (N: an integer equal to or greater than 1), and amplification sections 115-1 to 115-N (N: an integer equal to or greater than 1). Further, in the communication apparatus 10, for (the amplification sections 115-1 to 115-N of) the communication section 103, antennae 116-1 to 116-N (N: an integer equal to or greater than 1) are provided.

The control section 101 includes a processor such as, for example, a microprocessor and controls action of the associated blocks. Further, the control section 101 performs passage of information (data) between the blocks.

Further, the control section 101 performs scheduling of packets for the data processing section 102 and parameter setting for the modulation/demodulation section 111 and the signal processing section 112 of the communication section 103. Furthermore, the control section 101 performs parameter setting and transmission power control for the wireless interface sections 114-1 to 114-N and the amplification sections 115-1 to 115-N.

The data processing section 102 generates, at the time of transmission at which data is inputted from a protocol upper layer, a packet for wireless communication from the input data and performs such processes as addition of a header for media access control (MAC: Media Access Control) and addition of error detection codes. Then, the data processing section 102 outputs process data obtained as a result of the processes to (the modulation/demodulation section 111 of) the communication section 103.

On the other hand, at the time of reception at which data is inputted from (the modulation/demodulation section 111 of) the communication section 103, the data processing section 102 performs such processes as analysis of a MAC header, detection of packet errors, and a reorder process for the input data, and outputs process data obtained as a result of the processes to the protocol upper layer.

The communication section 103 performs processing relating to wireless communication under the control of the control section 101.

The modulation/demodulation section 111 performs, at the time of transmission, such processes as encode, interleave, and modulation, on the basis of coding and modulation methods set by the control section 101, for input data inputted from the data processing section 102. Then, the modulation/demodulation section 111 outputs a data symbol stream obtained as a result of the processes to the signal processing section 112.

On the other hand, at the time of reception, the modulation/demodulation section 111 performs processes reverse to those at the time of transmission, that is, such processes as demodulation, deinterleave, and decode, on the basis of coding and demodulation methods set by the control section 101, for a data symbol stream inputted from the signal processing section 112. Then, the modulation/demodulation section 111 outputs process data obtained as a result of the processes to the control section 101 or the data processing section 102.

The signal processing section 112 performs, at the time of transmission, such processes as signal processing which is applied for spatial separation as occasion demands, for a data symbol stream inputted from the modulation/demodulation section 111. Then, the signal processing section 112 outputs one or more transmission symbol streams obtained as a result of the processes individually to the wireless interface sections 114-1 to 114-N.

On the other hand, at the time of reception, the signal processing section 112 performs, for reception symbol streams individually inputted from the wireless interface sections 114-1 to 114-N, such processes as a signal process for spatial decomposition of a stream as occasion demands. Then, the signal processing section 112 outputs a data symbol stream obtained as a result of the processes to the modulation/demodulation section 111.

The channel estimation section 113 calculates complex channel gain information of a propagation path from the preamble part and the training signal part of each of input signals from the wireless interface sections 114-1 to 114-N. The complex channel gain information calculated by the channel estimation section 113 is used for a demodulation process by the modulation/demodulation section 111 and space processing by the signal processing section 112 through the control section 101.

The wireless interface section 114-1 converts, at the time of transmission, a transmission symbol stream inputted from the signal processing section 112 into an analog signal and performs such processes as filtering and up convert into a carrier frequency for the analog signal. Then, the wireless interface section 114-1 outputs (sends out) a transmission signal obtained as a result of the processes to the amplification section 115-1 or the antenna 116-1.

On the other hand, at the time of reception, the wireless interface section 114-1 performs processes reverse to those at the time of transmission, that is, such processes as down convert, for a reception signal inputted from the amplification section 115-1 or the antenna 116-1. Then, the wireless interface section 114-1 outputs a reception symbol stream obtained as a result of the processes to the signal processing section 112.

The amplification section 115-1 amplifies, at the time of transmission, a transmission signal (analog signal) inputted from the wireless interface section 114-1 to predetermined power and then outputs the amplified signal to the antenna 116-1. On the other hand, at the time of reception, the amplification section 115-1 amplifies a reception signal (analog signal) inputted from the antenna 116-1 to predetermined power and outputs the amplified signal to the wireless interface section 114-1.

It is to be noted that the wireless interface sections 114-2 to 114-N are configured similarly to the wireless interface section 114-1, the amplification sections 115-2 to 115-N are configured similarly to the amplification section 115-1, and the antennae 116-2 to 116-N are configured similarly to the antenna 116-1. Therefore, description of them is omitted here.

Further, in the case where there is no necessity to specifically distinguish the wireless interface sections 114-1 to 114-N, each of them is referred to as wireless interface section 114, in the case where there is no necessity to specifically distinguish the amplification sections 115-1 to 115-N, each of them is referred to as amplification section 115, and in the case where there is no necessity to specifically distinguish the antennae 116-1 to 116-N, each of them is referred to as antenna 116.

Further, (at least part of) one of the functions upon transmission and the functions upon reception of the amplification section 115 may be included in the wireless interface section 114. Further, (at least part of) one of the functions upon transmission and the functions upon reception of the amplification section 115 may be external components of the communication section 103. Furthermore, the wireless interface section 114, the amplification section 115, and the antenna 116 may be made one set, and one or more such sets may be included as components.

The power supply section 104 includes a battery power supply or a fixed power supply and provides power to the components of the communication apparatus 10.

Although the communication apparatus 10 configured in such a manner as described above is configured as the base station AP or the subordinate terminal STA in the wireless communication system of FIG. 1, in order to perform improvement of a communication characteristic that maintains the impartiality with adjacent networks BSS and improvement of a communication characteristic of the entire network associated with this, the control section 101 has such functions as described below.

In particular, the control section 101 controls the associated blocks in order to transmit information regarding a communication situation of the own base station AP (for example, the base station AP1) (such information is hereinafter referred to as "own communication situation information") to another base station AP (for example, the base station AP2) or receive, from another base station AP (for example, the base station AP2), information regarding a communication situation of the concerned another base station (such information is hereinafter referred to as "communication situation information of another base station").

Further, the control section 101 controls the associated blocks in order to determine, on the basis of the own communication situation information and the communication situation information of another base station, whether or not it is permissible (reasonable) to carry out (execute) control of a communication parameter such as a detection threshold value or transmission power in the own base station (for example, the base station AP1) or to determine whether or not it is permissible to transmit information relating to a control request of a communication parameter such as a detection threshold value or transmission power in another base station AP (for example, the base station AP2) (such information is hereinafter referred to as "control request information").

Since such control is performed, information sharing relating to communication quality between the networks is performed, and the impartiality with adjacent networks BSS is improved. Further, information sharing is performed between the base stations AP that supervise the networks BSS, and the base stations AP and their subordinate terminals STA operate on the basis of the shared information such that the throughput of the entire networks including the adjacent networks BSS is improved. Therefore, improvement of a communication characteristic maintaining the impartiality with the adjacent networks BSS and improvement of a communication characteristic of the entire networks associated with this can be implemented. As a result, the communication quality can be stabilized without relying upon the ambient environment.

Further, the control section 101 calculates a relative communication situation with respect to another base station AP (for example, the base station AP2) on the basis of the information shared from the base station AP and controls a communication parameter (for example, a detection threshold value or transmission power) of the own base station AP (for example, the base station AP1) and its subordinate terminals STA (for example, the subordinate terminals STA1*a* and STA1*b*) such that the impartiality in throughput with the other base station AP is improved. Furthermore, the control section 101 controls, on the basis of the information shared from another base station AP (for example, the base station AP2), a communication parameter (for example, a detection threshold value or transmission power) of the other base station AP (for example, the base station AP2) and its subordinate terminal STA (for example, the subordinate terminal STA1*b*).

It is to be noted that, together with widespread of a wireless LAN system, mutual interference between networks by densification of equipment equipped with a wireless LAN is a problem and the mutual interference gives rise to such problems as loss of communication opportunities of equipment equipped with a wireless LAN and deterioration of the communication quality as described hereinabove.

As a method for solving such problems as described above, such a contrivance as space reuse of adjusting a detection threshold value and transmission power to ignore interference from another network or suppressing interference to another network can be used. By using this space reuse, it is possible to create transmission opportunities in a dense and high interference environment thereby to implement improvement of communication quality.

The space reuse creates a transmission opportunity in a dense environment by adjusting a detection threshold value and transmission power to ignore interference from another network. Therefore, there is the possibility that this control may have a bad influence on the transmission opportunity and the communication quality of an adjacent network. Especially, in an independent distributed system such as a wireless LAN system, since maximization of the transmission opportunity and the communication quality of an own network is performed by such control without taking another network into consideration, there is the possibility that the impartiality between the networks may be damaged.

For example, in the technology disclosed in PTL 1 specified hereinabove, in the case where presence of other networks around an access point configuring a network is confirmed on the basis of information observed by the access point (AP) and its subordinate stations (STA) and all of the other networks have the function for transmission power control, the access point performs control of the transmission power of the own access point and the stations such that a specific condition is satisfied. Here, however, control of the detection threshold value that determines creation of a transmission opportunity is not taken into consideration, and therefore, a transmission opportunity cannot be created.

Further, with the technology disclosed in PTL 1, in the case where a network that does not have the function for transmission power control does not exist around, the control for transmission power cannot be carried out. Furthermore, although PTL 1 discloses arbitration between networks, since exchange of information necessary for arbitration and a controlling method for the detection threshold value and transmission power based on the information are not taken into consideration, it is not considered that a network that does not compromise the impartiality can be implemented.

In such a manner, from the point of view of improvement of a communication characteristic maintaining impartiality with adjacent networks and improvement of a communication characteristic of the entire networks associated with this, it is not considered that, even if the technology disclosed in PTL 1 is used, sufficient improvement can be achieved, and a technology for improving the communication characteristic is demanded. The present technology has been made in view of such a situation as just described and makes it possible to improve such a communication characteristic.

It is to be noted that, as communication situation information regarding a communication situation of a base station AP, communication situation information of the own base station AP (for example, the base station AP1) and communication situation information of another base station AP (for example, the base station AP2) are available as described above. Therefore, in the following description, the former is referred to as "own communication situation information (first communication situation information)" while the latter is referred to as "another base station communication situation information (second communication situation information)" to distinguish them from each other. However, in the case where there is no necessity to specifically distinguish the own communication situation information and another base station communication situation information from each other, each of them is referred to simply as communication situation information.

Further, as control request information regarding a control request of a communication parameter (for example, a detection threshold value or transmission power) in a base station AP (for example, the base station AP1), control request information of a communication parameter of another base station AP (for example, the base station AP2), and control request information of a communication parameter in the own base station AP (for example, the base station AP1), the former is referred to as "another base station control request information (first control request information)" while the latter is referred to as "own control request information (second control request information)" to distinguish them from each other. However, in the case where there is no necessity to specifically distinguish the other base station control request information and the own control request information from each other, each of them is referred to simply as control request information.

It is to be noted that the own control request information (second control request information) can include control request information of a communication parameter in the subordinate terminals STA (for example, the subordinate terminals STA1a and STA1b) of the own base station AP (for example, the base station AP1). Further, although the following description exemplifies a case in which at least one of a detection threshold value or transmission power is used specifically as the communication parameter, any other communication parameter than them may be used.

Here, the detection threshold value is a parameter relating to control of the detection sensitivity (detection level) of a signal, and by controlling this detection threshold value, for example, a period of time during which an idle state is to be held can be adjusted. Meanwhile, the transmission power is a parameter regarding power when a signal is to be transmitted, and by controlling this transmission power, for example, the reaching range of a signal to be transmitted can be adjusted.

(Example of Impartial Cooperation)

Figure 3:
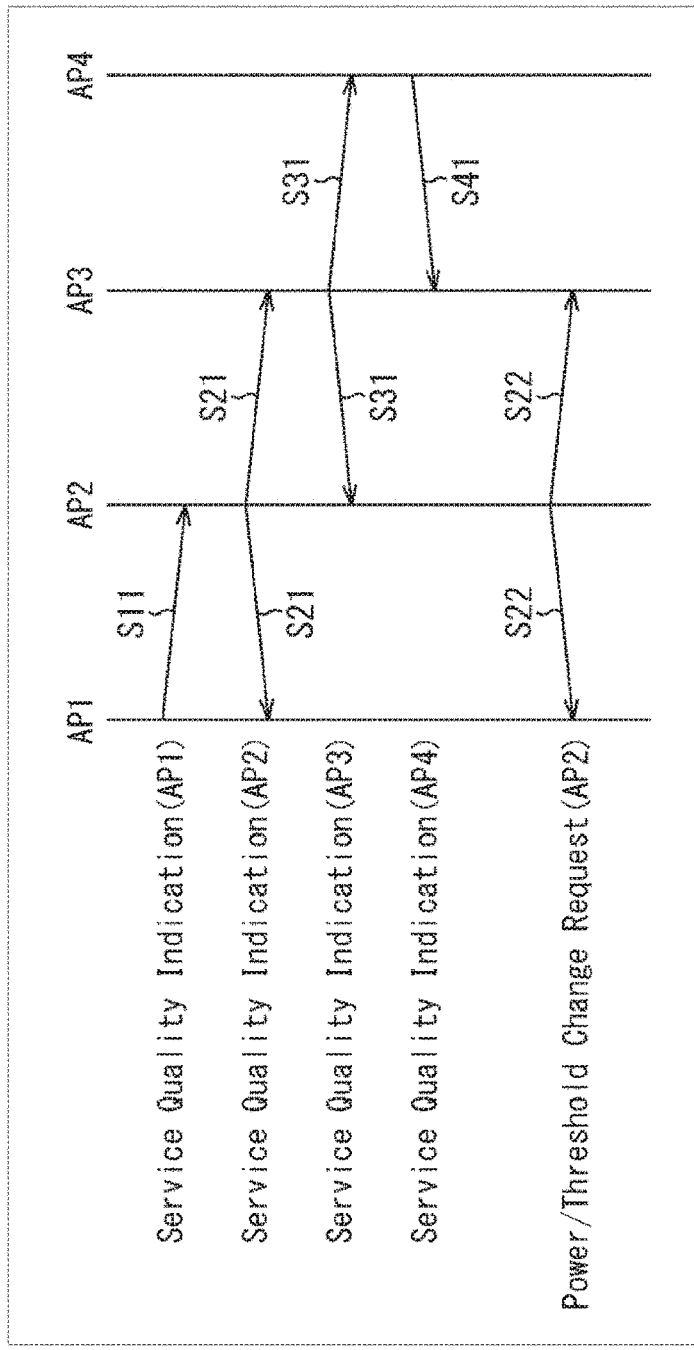
FIG. 3 is a sequence diagram depicting a first example of impartial cooperation.

Now, a particular example of a case in which, in the wireless communication system of FIG. 1, a base station AP that can transmit and receive communication situation information and carry out a control request of a communication parameter is detected and each such base station AP determines, on the basis of the communication situation information, whether or not it is permissible to carry out control of the own communication parameter, and then determines whether or not it is permissible to transmit control request information of a communication parameter to the other base stations AP is described with reference to FIGS. 3 and 4. Further, in the following description, to transmit and receive communication situation information and carry out a control request of a communication parameter is referred to as "impartial cooperation."

Here, detection of another base station AP with which a base station AP carries out impartial cooperation is started, for example, according to transmission to the base station AP of a signal regarding carrying out of impartial cooperation from a certain base station AP (such signal is hereinafter referred to as "impartial cooperation carrying out signal").

Transmission of the impartial cooperation carrying out signal is performed voluntarily by the base station AP. Alternatively, an application of an upper layer in the base station AP may issue a starting instruction to a lower layer (MAC layer) or a certain user may explicitly instruct part or all of the base stations AP.

It is to be noted that, in the wireless communication system, an impartial cooperation carrying out signal to be transmitted from a base station AP may be transmitted to a broadcast address or may be transmitted periodically. Further, an impartial cooperation carrying out signal may be transmitted as part of a beacon frame. Furthermore, an impartial cooperation carrying out signal may include communication state observation information regarding observation of a communication situation. This communication situation observation information can include, for example, information regarding communication quality to be observed and time of observation.

Furthermore, the impartial cooperation carrying out signal may include transmission information regarding transmission of communication situation information. This transmission information is information regarding a schedule or a resource of transmission. Further, the impartial cooperation carrying out signal may include communication parameter information regarding a communication parameter of a base station AP. In this case, the base station AP receiving the impartial cooperation carrying out signal may determine, on the basis of the communication parameter information included in the impartial cooperation carrying out signal, another base station AP with which impartial cooperation is to be performed.

The other base station AP receiving the impartial cooperation carrying out signal transmits a signal including agreement information regarding agreement of impartial cooperation and identifier information regarding an identifier of the other base station AP itself (such signal is hereinafter referred to as "impartial cooperation agreement signal"). It is to be noted that the other base station AP may select that impartial cooperation is not to be carried out, and in this case, it is sufficient if the other base station AP transmits an impartial cooperation disagreement signal as a signal including disagreement information indicating that the other base station AP does not agree with impartial cooperation. Alternatively, in this case, the other base station AP may not transmit an impartial cooperation disagreement signal (may transmit nothing).

For example, the base station AP may select that impartial cooperation is not to be performed in the case where, among the subordinate terminals STA of the base station AP itself, a certain number or more of subordinate terminals STA are terminals that are not correspond to the function for impartial cooperation (what is generally called legacy terminals). It is to be noted here that the base station AP confirms, when it tries to establish connection to a subordinate terminal STA, whether the subordinate terminal STA corresponds to the function for impartial cooperation.

By the procedure described above, the base station AP can detect other base stations AP with which the base station AP is to carry out impartial cooperation and acquire identifiers of the other base stations AP. Further, where each base station AP carries out the procedure described above, each base station AP can also detect of the other base stations AP and acquire identifiers of the other base stations AP similarly.

For example, in the wireless communication system depicted in FIG. 1, the base station AP1 detects the base station AP2, the base station AP2 detects the base station AP1 and the base station AP3, the base station AP3 detects the base station AP2 and the base station AP4, and the base station AP4 detects the base station AP3, individually as another base station or stations AP with which impartial cooperation is to be carried out.

Further, the impartial cooperation carrying out signal may be transmitted periodically after each base station AP detects other base stations AP and acquires identifiers of other base stations AP. This makes it possible, even in the case where a newly added base station AP exists, to detect the added base station AP as another base station AP with which impartial cooperation is to be carried out. Further, even in the case where communication situation observation information included in an impartial cooperation carrying out signal is changed, it is possible to notify the other base stations AP, with which impartial cooperation is performed already, of the communication situation observation information after the change.

It is to be noted that detection by a base station AP of another base station AP with which the base station AP carries out impartial cooperation may be carried out through another terminal such as, for example, a subordinate terminal STA without performing direct communication between the base stations AP. In this case, information that is transmitted and received in the impartial cooperation may be transmitted and received through the other terminal.

After other base stations AP with which impartial cooperation is to be carried out are detected in such a manner, each base station AP transmits and receives communication situation information and then carries out control of the own communication parameter and transmission and reception of control request information of a communication parameter. It is to be noted that, when impartial cooperation is carried out, although, for example, the base station AP2 detects the base station AP1 and the base station AP3, the base station AP1 and the base station AP3 need not recognize that they are detected by the base station AP2. Also in the case where detection is performed through a subordinate terminal STA, it is only necessary for the subordinate terminal STA to notify the base station AP of the detection notification of the address of the source base station AP. In other words, in the wireless communication system of FIG. 1, there is no necessity to use such a concept as a group.

FIG. 3 is a sequence diagram depicting a first example of the impartial cooperation.

In FIG. 3, the base station AP1 transmits own communication situation information (Service Quality Indication (AP1)), and the communication situation information is received by the base station AP2 (S11). Then, the base station AP2 transmits own communication situation information (Service Quality Indication (AP2)), and the communication situation information is received by the base station AP1 and the base station AP3 (S21).

It is to be noted that, although, in this example, the base station AP2 transmits own communication situation information by broadcasting, it may otherwise transmit the communication situation information separately to the base station AP1 and the base station AP3.

Thereafter, the base station AP3 and the base station AP4 transmit own communication situation information (Service Quality Indication (AP3, AP4)) similarly, and the communication situation information is received by the base station AP2 and base station AP4 and by the base station AP3, respectively (S31 and S41).

By the sequence described above, each base station AP can obtain communication situation information (communication situation information of another base station) of any other base station AP with which the base station AP is to carry out impartial cooperation.

It is to be noted that the order of the base stations AP that transmit communication situation information depicted in the sequence diagram of FIG. 3 is exemplary and this is not restrictive. Further, the communication situation information may be transmitted by a signal (frame) same as or a signal (frame) continuing to the impartial cooperation carrying out signal.

Each base station AP that acquires communication situation information from another base station AP with which it is to carry out impartial cooperation (communication situation information of another base station) performs, on the basis of the own communication situation information and the communication situation information of the other base stations, decision of whether the own communication situation is good or bad. For example, each base station AP compares throughputs on the basis of the own communication situation information and the communication situation information of the other base stations and decides, in the case where the throughput of the own communication situation information is lowest, that the own communication state is bad. This decision process may be based on some other information included in the communication situation information (information other than the throughput) or may be decided that the own communication state is bad, not restrictively to the case where the throughput is lowest, but, for example, in the case where the throughput is included in a fixed ratio from the lowest.

The base station AP that decides that the own communication situation is bad calculates a first index using a predetermined arithmetic expression and compares the calculated first index and a first threshold value with each other. This first index can be calculated, for example, from the number of transmission opportunity acquisitions. By performing decision based on this number of transmission opportunity acquisitions, a control amount for the detection threshold value that has a high influence on increase/decrease of the number of transmission opportunity acquisitions can be determined with increased accuracy. Here, for example, a ratio α of the number of its own transmission opportunity acquisitions to average number of transmission opportunity acquisitions can be used. This ratio α can be determined, for example, from the following expression (1).

$$\alpha = \text{the number of own transmission opportunity acquisitions} \div ((\text{the number of own transmission opportunity acquisitions} + \text{total number of transmission opportunity acquisitions of other base stations AP with which impartial cooperation is carried out}) \div (\text{number of other base stations AP with which impartial cooperation is carried out} + 1)) \quad (1)$$

It is to be noted that the number of its own transmission opportunity acquisitions in the expression (1) is the number of transmission opportunity acquisitions in the own base station AP. Further, the first threshold value may be a value determined in advance or otherwise may be, for example, a value included in and notified by an impartial cooperation carrying out signal.

The base station AP carries out control of the own communication parameter in the case where it decides on the basis of a result of the comparison between the calculated first index and the first threshold value that the number of its own transmission opportunity acquisitions is lower than those of the other base stations AP with which it carries out impartial cooperation.

Here, the base station AP can increase, for example, the detection threshold value by a fixed value as the control of an own communication parameter. The value of this increase may be a value determined in advance or may otherwise be a value included in and notified by an impartial cooperation carrying out signal or a value calculated from a difference between the first index and the first threshold value. By increasing the detection threshold value in such a manner, in the base station AP, the period of time during which it is placed in an idle state increases and the number of transmission opportunity acquisitions increases.

Further, in the base station AP, the transmission power may be controlled according to an increase of the detection threshold value as the control of an own communication parameter. Furthermore, a limit value may be set in advance for the detection threshold value or the transmission power. For example, by providing a lower limit to the transmission power while an upper limit is provided for the detection threshold value, it can be suppressed that excessive control disables intended communication.

In the sequence diagram of FIG. 3, for example, the base station AP2 can carry out the control of a communication parameter described above.

It is to be noted that the base station AP can carry out control reverse to the control of a control parameter described above in the case where it is decided, on the basis of a result of the comparison between the calculated first index and the first threshold value, in the decision process described above that is based on the number of transmission opportunity acquisitions, that the number of its own transmission opportunity acquisitions is higher than those of the other base stations AP with which the base station AP carries out impartial cooperation. In particular, the base station AP carries out action of suppressing an excessive number of transmission opportunity acquisitions by decreasing the detection threshold value to reduce the period of time during which an idle state is held.

Then, the base station AP2 having carried out the control of the own communication parameter carries out determination of control request information of a communication parameter in the other base stations AP (base station AP1 and base station AP3) with which the base station AP2 carries out impartial cooperation (control request information of another base station). For example, the base station AP2 calculates a second index using a predetermined arithmetic expression from the own communication situation information and the communication situation information of the other base stations, and then compares the calculated second index and the second threshold value with each other.

This second index can be calculated using, for example, a throughput included in the communication situation information. By performing such calculation based on a throughput, the control amount directly connected to improvement of the impartiality of the throughput of the entire networks can be determined. Further, here, it is possible to use, for example, a ratio β of the throughput of the other base stations AP with which the base station AP2 carries out impartial cooperation to an average value of the throughput. This ratio β can be calculated from the following expression (2).

$$\beta = \text{throughput of other base stations AP with which base station carries out impartial cooperation} \div ((\text{own throughput} + \text{total number of throughputs of other base stations AP with which impartial cooperation is carried out}) \div (\text{number of other base stations AP with which impartial cooperation is carries out} + 1))$$ (2)

It is to be noted that the own throughput in the expression (2) is a throughput of the own base station AP. Further, calculation of the ratio β is performed for the number of base stations AP that are requesting destinations of the control. Further, the second threshold value may be a value determined in advance or may be, for example, a value included in and notified by an impartial cooperation carrying out signal or a like value.

The base station AP carries out transmission of control request information of a communication parameter (control request information of another base station) to the other base stations AP, whose throughput has been decided to be higher than those of all base stations AP with which impartial cooperation is carried out (the base stations AP of a high throughput), on the basis of a result of the comparison between the calculated second index and the second threshold value.

Here, the base station AP can either decrease the detection threshold value by a fixe value or decrease the transmission power by a fixe value, for example, as the control of a communication parameter in the base station AP of a high throughput. The value by the decrease may be a value determined in advance or otherwise may be, for example, a value included in and notified by an impartial cooperation carrying out signal, a value calculated from a difference between the second index and the second threshold value or the like.

By decreasing the detection threshold value in such a manner, in a base station AP of a high throughput, the period of time during which an idle state is held decreases to decrease the number of transmission opportunity acquisitions, and an excessive throughput can be suppressed. Further, in a base station AP of a high throughput, interference with another base station AP can be suppressed further by decreasing the transmission power.

Further, a limit may be set in advance to the detection threshold value or the transmission power. For example, by providing a lower limit for the transmission power while an upper limit is provided for the detection threshold value, it can be suppressed that excessive control disables intended communication.

In the sequence diagram of FIG. 3, after the base station AP2 carries out determination of control request information of a communication parameter for the other base stations AP (base station AP1 and base station AP3) with which the base station AP2 carries out impartial cooperation (control request information of the other base stations), the base station AP2 transmits the concerned control request information (Power/Threshold Change Request (AP2)) (S22). In the meantime, the base station AP1 and the base station AP3 individually receive the control request information (Power/Threshold Change Request (AP2)) from the base station AP2 and individually carry out control of the detection threshold value or the transmission power on the basis of the received control request information (own control request information).

It is to be noted that, although, in the present example, the base station AP2 transmits the control request information by broadcasting, it may transmit the control request information individually to each of the base station AP1 and the base station AP3. Further, any base station AP that carries out control of a communication parameter may request the subordinate terminals STA under the base station AP to carry out control of a communication parameter similarly.

Here, the base station AP that carries out control of a communication parameter in the subordinate terminals STA under the base station AP itself possibly becomes any of a base station AP that decides that the number of its own transmission opportunity acquisitions is lower than those of the other base stations AP with which impartial cooperation is performed and a base station AP that receives control request information of another base station.

Further, when a base station AP carries out control of a communication parameter in a subordinate terminal STA under the base station AP itself, it may set the control amount (control amount for the detection threshold value or the transmission power) to a control amount equal to the own control amount or a control amount obtained, for example, by applying fixed correction to the control amount used in the control of the own communication parameter (control amount of the detection threshold value or the transmission power).

FIG. 4 is a sequence diagram depicting a second example of impartial cooperation.

In FIG. 4, each of the base station AP2 and the base station AP4 decides that its own communication situation is bad and carries out transmission, to another base station AP with which impartial cooperation is to be carried out, of control request information of another base station (S22 and S42). Description until the transmission of the control request information is carried out (S11, S21, S31, and S41 of FIG. 4) is similar to the substance described hereinabove with reference to FIG. 3, and therefore, the description is omitted here.

In FIG. 4, the base station AP3 receives control request information (Power/Threshold Change Request (AP2, AP4)) from the base station AP2 and the base station AP4 (S22 and S42). At this time, the base station AP3 carries out control of the detection threshold value or the transmission power on the basis of the control request information (own control request information) individually from the base station AP2 and the base station AP4.

Here, the base station AP3 can carry out, on the basis of one of the pieces of control request information from the base station AP2 and the base station AP4 (own control request information), control of a communication parameter or carry out, after it applies correction to the piece of control request information received second, control of a communication parameter on the basis of the corrected control request information.

For example, the base station AP3 may ignore, after it receives the control request information from the base station AP2, the other control request information received within a fixed period. Alternatively, for example, the base station AP3 may apply, after it receives the control request information from the base station AP2, to a control amount (a control amount of detection threshold value or transmission power) included in the other control request information received within a fixed period, correction for decreasing the control amount, and then carry out control of a communication parameter.

The foregoing description of the sequences depicted in FIGS. 3 and 4 is directed to action based on communication situation information received most recently by a base station AP. However, one or a plurality of pieces of communication situation information received in the past may be stored in a memory such as a nonvolatile memory such that action is performed on the basis of the stored communication situation information. For example, a result of moving averaging of the number of pieces of communication situation information corresponding to a plural number of times may be used for such action. Further, for example, the communication situation information may be information from a plurality of sections of an observation period. At this time, a base station AP may use part of the sections of the information to calculate the ratio $\alpha$ and the ratio $\beta$.

Further, although the description of the sequences depicted in FIGS. 3 and 4 is directed to action in the case where each base station AP carries out transmission and reception of communication situation information, determination of carrying out of control of an own communication parameter based on communication situation information, and transmission and reception of control request information to another base station AP, the wireless communication network may include a supervising apparatus as an apparatus that supervises at least part of such actions.

For example, each base station AP may transmit communication situation information to the supervising apparatus such that the supervising apparatus determines control request information of a communication parameter for each base station AP and transmit the control request information to each base station AP. This function of the supervising apparatus may be allocated to one of the base stations AP or may be applied to another base station AP or an apparatus for exclusive use that performs only supervision of action. Further, communication between the supervising apparatus and the base stations AP may be performed naturally using a frequency same as a frequency normally used by each base station AP or using a different frequency. Further, such communication may be implemented by wired communication.

(Example of Action of Base Station AP)

Now, a first example of action of (the control section 101 of) the communication apparatus 10 configured as a base station AP is described with reference to a flow chart of FIG. 5.

In step S101, the control section 101 confirms whether a subordinate terminal STA of the own base station AP corresponds to the function for impartial cooperation.

In step S102, the control section 101 decides whether an impartial cooperation carrying out signal is to be transmitted. In step S102, in the case where it is decided that an impartial cooperation carrying out signal is to be transmitted, the processing is advanced to step S103.

In step S103, the control section 101 decides whether an impartial cooperation agreement signal is received from another base station AP. In the case where it is decided in step S103 that an impartial cooperation agreement signal is received, the processing is advanced to step S106.

On the other hand, in the case where it is decided in step S102 that an impartial cooperation carrying out signal is not transmitted, the processing is advanced to step S104.

In step S104, the control section 101 decides whether an impartial cooperation carrying out signal is received from another base station AP. In the case where it is decided in step S104 that an impartial cooperation carrying out signal is received, the processing is advanced to step S105.

In step S105, the control section 101 decides whether an impartial cooperation agreement signal is to be transmitted. In the case where it is decided in step S105 that an impartial cooperation agreement signal is to be transmitted, the processing is advanced to step S106.

In such a manner, in the case where it is decided in step S103 that an impartial cooperation agreement signal is received ("YES" in step S103), or in the case where it is decided in step S105 that an impartial cooperation agreement signal is transmitted ("YES" in step S105), the processing is advanced to step S106.

Figure 5:
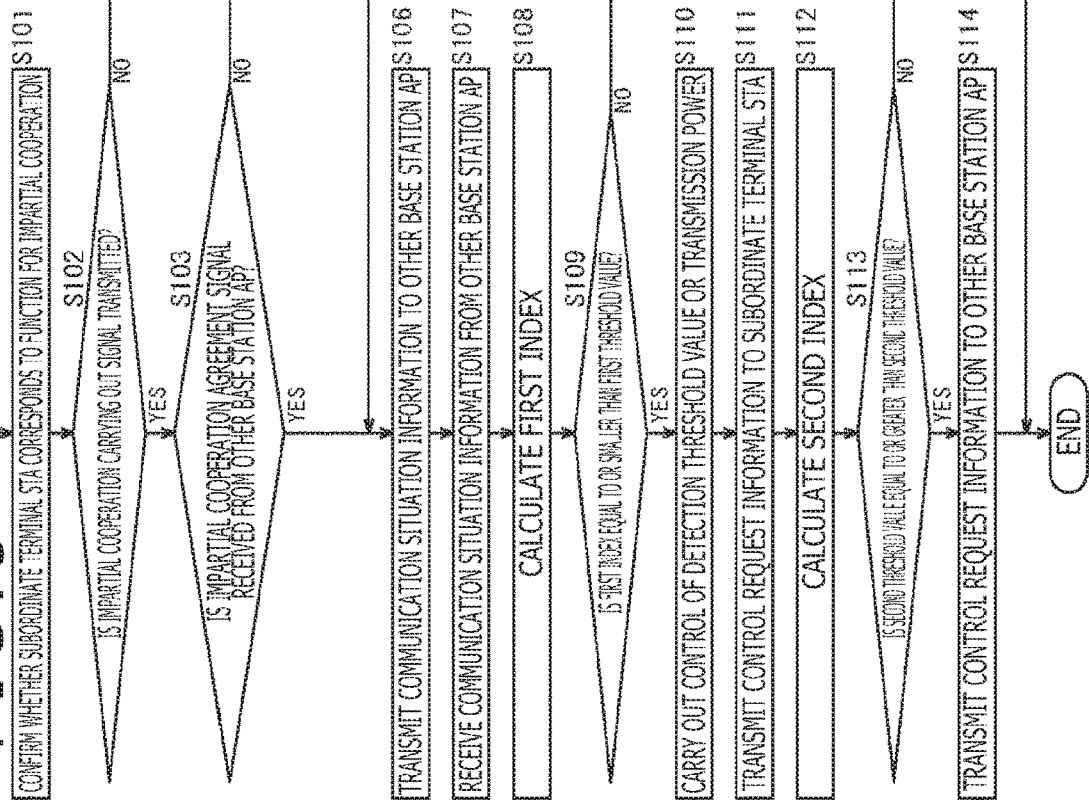
FIG. 5 is a flow chart depicting a first example of action of a base station AP.

It is to be noted that, in the case where it is decided in step S103 that an impartial cooperation agreement signal is not received ("NO" in step S103), in the case where it is decided in step S104 that an impartial cooperation carrying out signal is not received ("NO" in step S104), or in the case where it is decided in step S105 that an impartial cooperation agreement signal is not transmitted ("NO" in step S105), the process depicted in FIG. 5 ends.

In step S106, the control section 101 transmits own communication situation information to the other base station AP. Here, for example, the communication apparatus 10 as the base station AP2 transmits the own communication situation information including information relating to a throughput, the number of transmission opportunity acquisitions and so forth to (the communication apparatus as) the base station AP1 and the base station AP3. It is to be noted that the format of the own communication situation information is hereinafter described with reference to FIGS. 10 and 11.

In step S107, the control section 101 receives communication situation information of another base station from the other base station AP. Here, for example, the communication apparatus 10 as the base station AP2 receives communication situation information of another base station transmitted from (the communication apparatus as) the base station AP1 and the base station AP3. It is to be noted that the format of the communication situation information of another base station is hereinafter described with reference to FIGS. 10 and 11.

In step S108, the control section 101 calculates a first index on the basis of the communication situation information. Here, for example, the expression (1) given hereinabove is arithmetically operated to calculate a first index, for example, on the basis of the own communication situation information and the communication situation information of the other base station.

In step S109, the control section 101 decides whether the calculated first index is equal to or smaller than the first threshold value. In the case where it is decided in step S109 that the first index is equal to or smaller than the first threshold value, the processing is advanced to step S110.

In step S110, the control section 101 carries out control of the detection threshold value or the transmission power as control of an own communication parameter. Here, for example, in the case where the communication apparatus 10 as the base station AP2 decides that the number of its own transmission opportunity acquisitions is lower than those of the base station AP1 and the base station AP3, the communication apparatus 10 carries out control for increasing the detection threshold value. Consequently, in the base station AP2, the period of time for which it is in an idle state increases and the number of transmission opportunity acquisitions increases.

In step S111, the control section 101 transmits its own control request information to the subordinate terminals STA. Here, for example, in the case where the communication apparatus 10 as the base station AP2 confirms by the process in step S101 that the subordinate terminal STA1*b* under the base station AP2 itself corresponds to impartial cooperation, the communication apparatus 10 transmits the own control request information to the subordinate terminal STA1*b*.

Consequently, the subordinate terminal STA1*b* carries out, for example, control of the detection threshold value or the transmission power similarly to the base station AP2. It is to be noted that details of action of the subordinate terminal STA are hereinafter described with reference to a flow chart of FIG. 7. Further, in the case where a subordinate terminal STA that corresponds to impartial cooperation does not exist or in the case where control of a communication parameter in the subordinate terminals STA is not to be carried out, the process in step S111 may be skipped. It is to be noted that the format of the own control request information is hereinafter described with reference to FIG. 12.

In step S112, the control section 101 calculates a second index on the basis of communication situation information. Here, for example, the expression (2) given hereinabove is arithmetically operated to calculate the second index, for example, on the basis of the own communication situation information and the communication situation information of the other base station.

In step S113, the control section 101 decides whether the calculated second index is equal to or greater than the second threshold value. In the case where it is decided in step S113 that the second index is equal to or greater than the second threshold value, the processing is advanced to step S114.

In step S114, the control section 101 transmits control request information of the other base station to the other base station AP. Here, for example, the communication apparatus 10 as the base station AP2 transmits, to the base station AP1 whose throughput is decided to be higher than those of all base stations AP with which impartial cooperation is carried out, control request information for decreasing the detection threshold value by a fixed value. Consequently, in the base station AP1 of a high throughput, the period of time within which it remains in an idle state decreases and the number of transmission opportunity acquisitions decreases. It is to be noted that the format of the control request information of another base station is hereinafter described with reference to FIG. 12.

On the other hand, in the case where it is decided in step S109 that the first index exceeds the first threshold value, the processing is advanced to step S115.

In step S115, the control section 101 decides whether a fixed period elapses. In the case where it is decided in step S115 that the fixed period elapses, the processing is advanced to step S116.

In step S116, the control section 101 decides whether own control request information is received from the other base station AP. In the case where it is decided in step S116 that own control request information is received, the processing is advanced to step S117.

In step S117, the control section 101 carries out control of the detection threshold value or the transmission power as control of an own communication parameter on the basis of the received own control request information. Here, for example, the communication apparatus 10 as the base station AP2 carries out control of increasing or decreasing the detection threshold value or the like on the basis of the control request information received from the base station AP1 or the base station AP3.

In step S118, the control section 101 transmits the received own control request information to the subordinate terminal STA. Here, for example, the communication apparatus 10 as the base station AP2 transmits the control request information received from the base station AP1 or the base station AP3 to the subordinate terminal STA1*b* under the base station AP2 itself. Consequently, the subordinate terminal STA1*b* carries out, for example, control of the detection threshold value or the transmission power in a similar manner to the base station AP2. It is to be noted that the format of the own control request information is hereinafter described with reference to FIG. 12.

In the case where the process in step S114 or S118 ends or in the case where it is decided in step S113 that the second index is smaller than the second threshold value ("NO" in S113) or otherwise in the case where it is decided in step S116 that control request information from the other base station AP is not received ("NO" in S116), the process depicted in FIG. 5 ends.

The first example of action of the communication apparatus 10 configured as a base station AP has been described.

It is to be noted that the process depicted in FIG. 5 is an example of action of the communication apparatus 10, and another action may be performed. For example, where it is decided whether the communication situation of the own base station AP is good, only in the case where the own communication situation is bad, determination of whether or not control of an own communication parameter may be performed or determination of whether or not transmission of control request information of a communication parameter to another base station AP is permissible or like determination may be performed.

Figure 6:
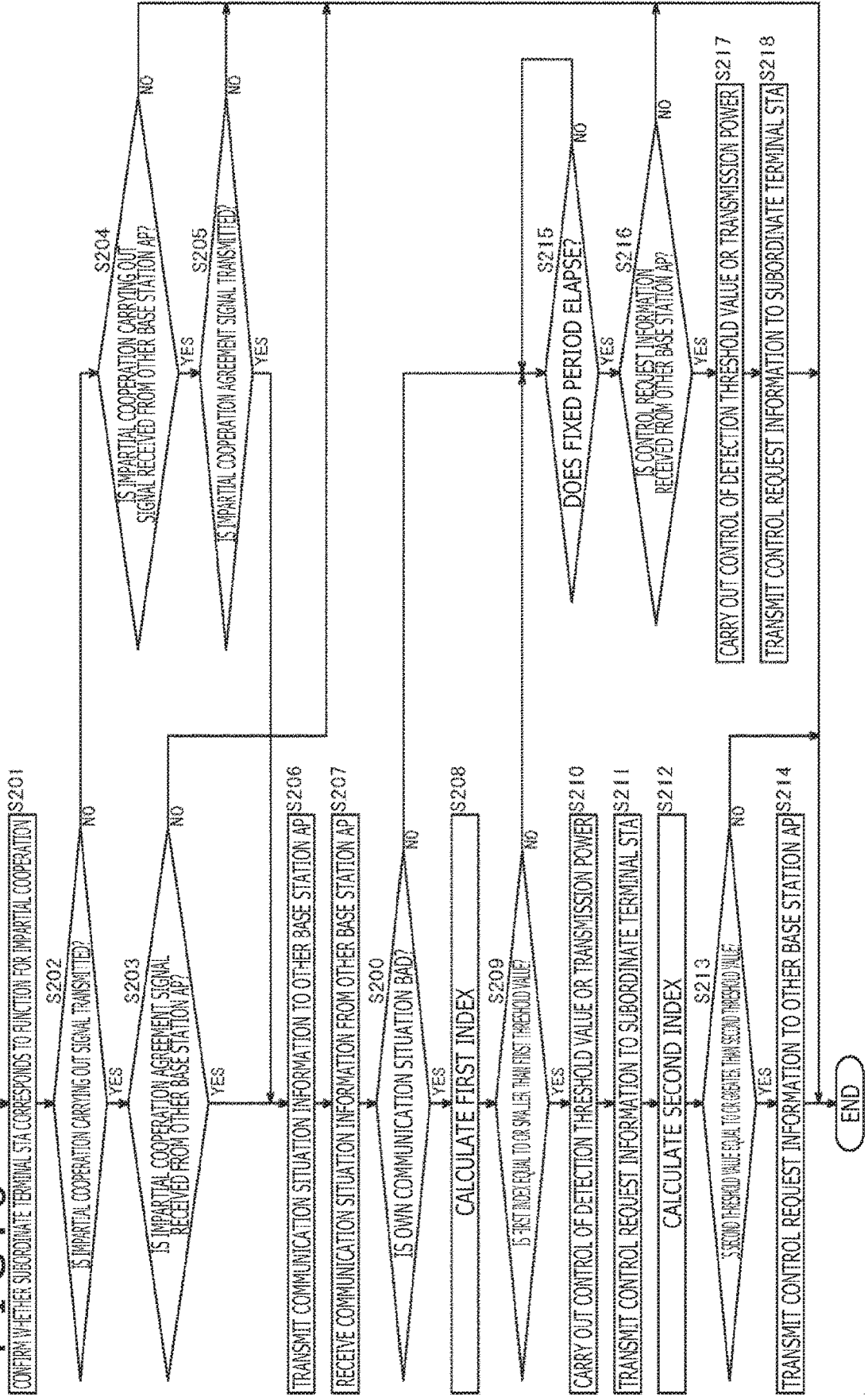
FIG. 6 is a flow chart depicting a second example of action of the base station AP.

FIG. 6 is a flow chart illustrating a second example of action of (the control section 101 of) the communication apparatus 10 configured as a base station AP.

In steps S201 to S207, a decision process according to a result of transmission or reception of an impartial cooperation carrying out signal or an impartial cooperation agreement signal is performed and own communication situation information is transmitted to another base station AP and besides communication situation information of the other base station transmitted from the other base station AP is received similarly as in steps S101 to S107 of FIG. 5.

After the process in step S207 ends, the processing is advances to step S200. In step S200, the control section 101 decides, on the basis of the own communication situation information and the communication situation information of the other base station, whether the own communication situation is bad.

Here, for example, the communication apparatus 10 as the base station AP2 compares throughputs on the basis of the own communication situation information and the communication situation information of the other base station. Then, in the case where the throughput of the base station AP2 is lowest in comparison with the other base stations AP such as the base station AP1 and the base station AP3, the communication apparatus 10 can decide that the own communication state is bad.

In the case where it is decided in step S200 that the own communication situation is bad, the processing is advanced to step S208. In steps S208 to S214, a threshold value decision using the calculated first index or second index is performed and such processes as control of an own communication parameter and transmission of control request information of a communication parameter to another base station AP (control request information of another base station) are performed similarly as in steps S108 to S114 of FIG. 5.

On the other hand, in the case where it is decided in step S200 that the own communication situation is good, the processing is advanced to step S215. In steps S215 to S218, control of an own communication parameter and such processes as transmission of control request information of a communication parameter to the subordinate terminals STA (own control request information) are carried out on the basis of the received own control request information similarly as in steps S115 to S118 of FIG. 5.

The second example of action of the communication apparatus 10 configured as a base station AP has been described.

(Example of Action of Subordinate Terminal STA)

In the following a first example of action of (the control section 101 of) the communication apparatus 10 configured as a subordinate terminal STA is described with reference to a flow chart of FIG. 7.

In step S301, the control section 101 notifies a base station AP of a connection destination that the communication apparatus 10 corresponds to the function of impartial cooperation. This makes it possible for the communication apparatus 10 configured as the base station AP to confirm, when it performs the process in step S101 of FIG. 5, whether the subordinate terminal STA corresponds to the function of impartial cooperation.

In step S302, the control section 101 decides whether control request information is received from the base station AP of the connection destination. In the case where it is decided in step S302 that control request information is received, the processing is advanced to step S303. For example, in the case where control request information (own control request information) is transmitted from the base station AP of the connection destination by the process in step S111 or S118 of FIG. 5, the subordinate terminal STA receives the control request information from the base station AP of the connection destination.

In step S303, the control section 101 carries out control of the detection threshold value or the transmission power as control of an own communication parameter on the basis of the received control request information. Here, for example, the communication apparatus 10 as the subordinate terminal STA1b carries out control of a communication parameter similar to that by the base station AP2 on the basis of the control request information received from the base station AP2 of the connection destination.

Figure 7:
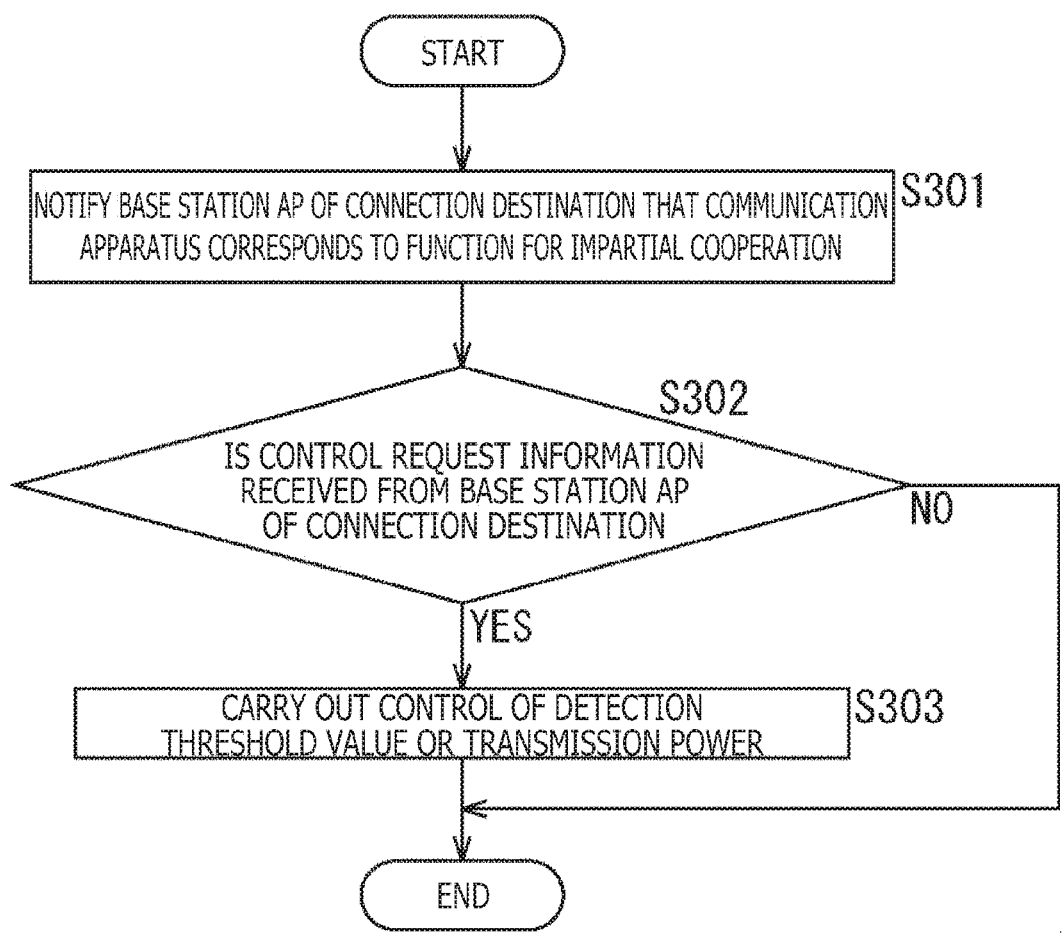
FIG. 7 is a flow chart depicting a first example of action of a subordinate terminal STA.

When the process in step S303 ends, the process depicted in FIG. 7 ends. It is to be noted that, in the case where it is decided in step S302 that control request information is not received, the process in step S303 is skipped and the process depicted in FIG. 7 ends.

The first example of action of the communication apparatus 10 configured as a subordinate terminal STA has been described.

Figure 8:
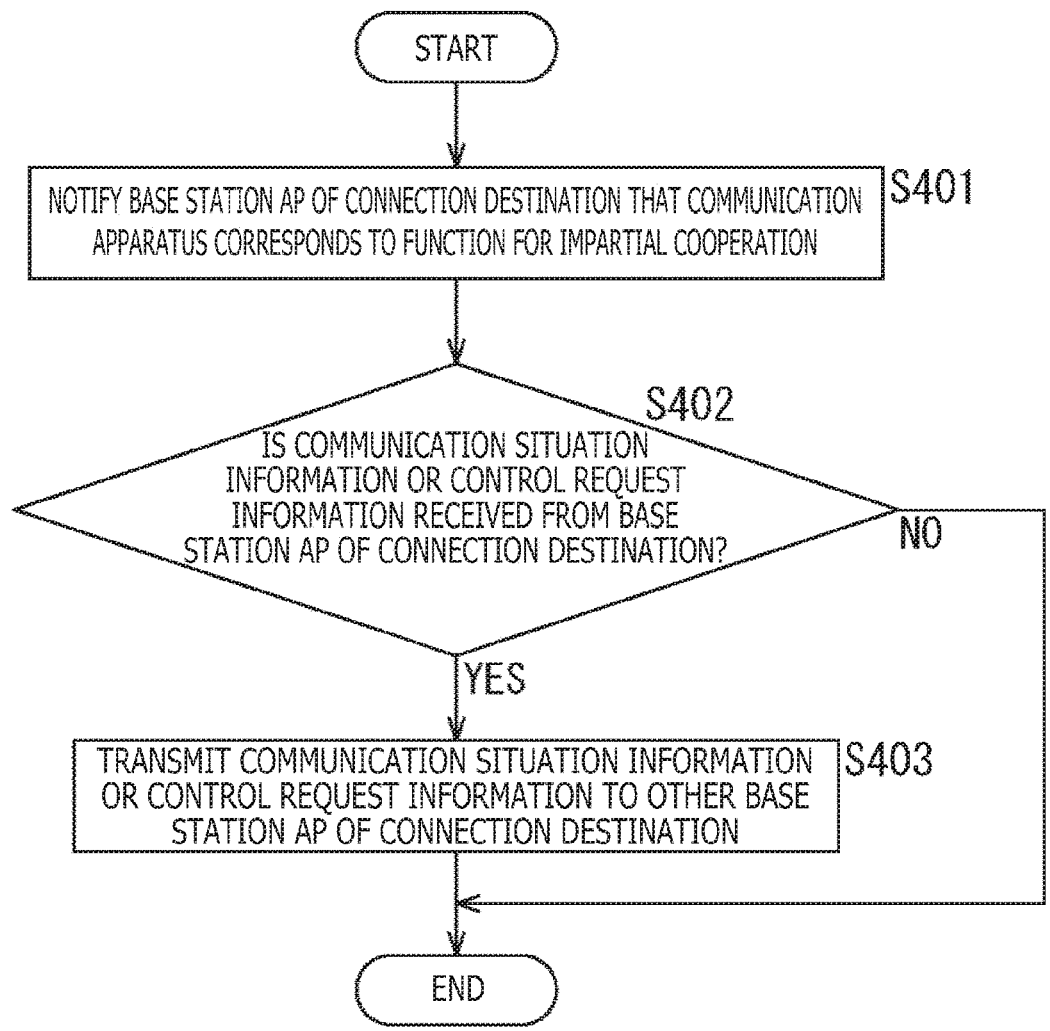
FIG. 8 is a flow chart depicting a second example of action of the subordinate terminal STA.

Now, a second example of action of (the control section 101 of) the communication apparatus 10 configured as a subordinate terminal STA is described with reference to a flow chart of FIG. 8.

In step S401, the communication apparatus 10 notifies a base station AP of a connection destination that the communication apparatus 10 corresponds to the function of impartial cooperation similarly as in step S301 of FIG. 7.

In step S402, the control section 101 decides whether communication situation information or control request information is received from the base station AP of the connection destination. In the case where it is decided in step S402 that communication situation information or control request information is received, the processing is advanced to step S403.

In step S403, the control section 101 transmits the received communication situation information or control request information to another base station AP of a connection destination.

Figure 9:
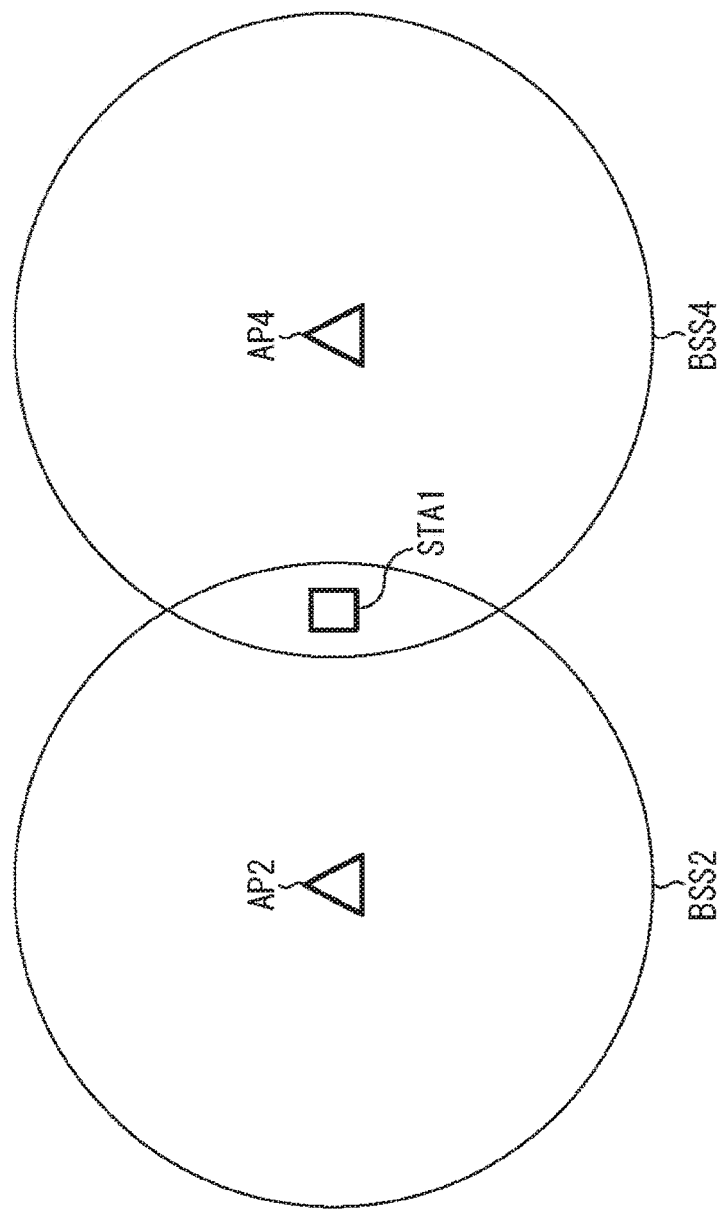
FIG. 9 is a view depicting an example of another configuration of the wireless communication system.

Here, a case is assumed in which the subordinate terminal STA1 is connected to the base station AP2 and the base station AP4 as depicted in FIG. 9. At this time, in the case where the subordinate terminal STA1 receives communication situation information or control request information from the base station AP4, the subordinate terminal STA1 can transmit the received communication situation information or control request information to the base station AP2. On the other hand, in the case where the subordinate terminal STA1 receives communication situation information or control request information from the base station AP2, it is also possible for the subordinate terminal STA1 to transmit the received information to the base station AP4.

In such a manner, even in the case where information cannot be exchanged directly between base stations AP, utilization of a common subordinate terminal STA to the base stations AP makes it possible to exchange information of communication situation information, control request information and so forth.

Referring back to FIG. 8, when the process in step S403 ends, the process depicted in FIG. 8 ends. It is to be noted that, in the case where it is decided in step S402 that communication situation information or control request information is not received, the process in step S403 is skipped and the process depicted in FIG. 8 ends.

The second example of action of the communication apparatus 10 configured as a subordinate terminal STA has been described.

(Example of Format of Frame in which Communication Situation Information is Placed)

Figure 10:
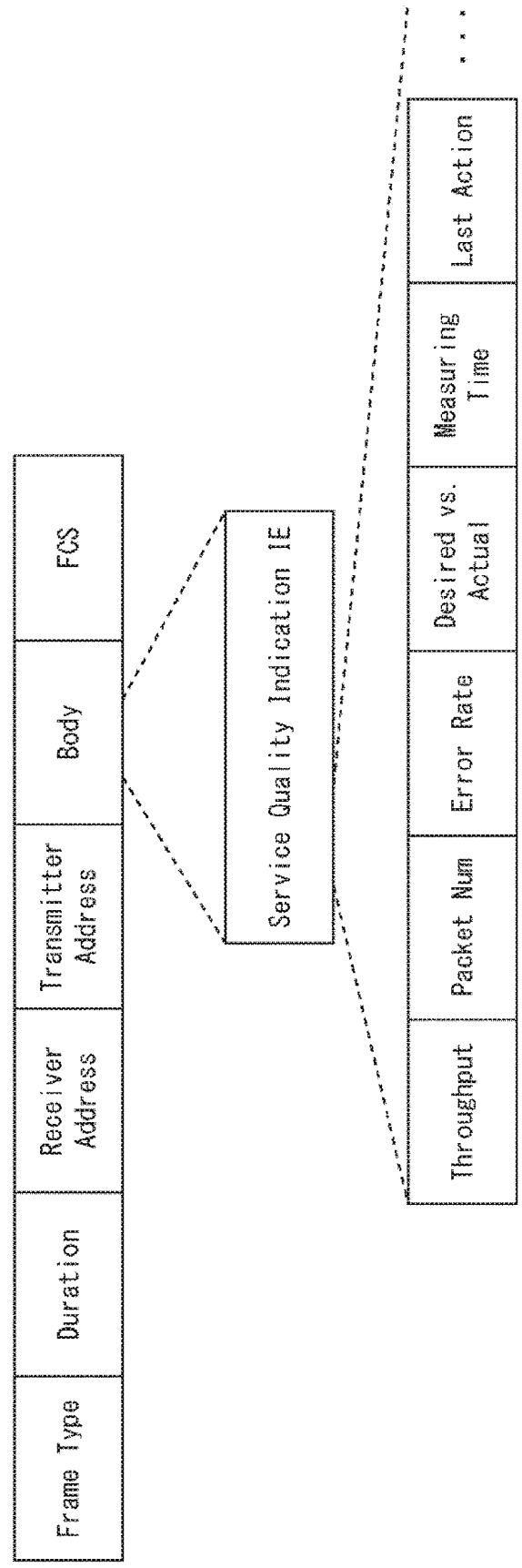
FIG. 10 is a view depicting a first example of a format of a frame in which communication situation information is placed.

FIG. 10 is a diagram depicting an example of a format of a frame in which communication situation information is placed.

In FIG. 10, the frame in which communication situation information is placed includes Frame Type, Duration, Receiver Address, Transmitter Address, Body, and FCS.

In Frame Type, information regarding a kind of this frame is placed. For example, in the case where the frame is transmitted as a Beacon Frame, information indicating that the kind of the frame is Beacon is placed, in the case where the frame is transmitted as an Action Frame that is a Radio Measurement Report, information indicating that the kind of the frame is Action is place, and in the case where the frame is transmitted as a frame for the notification of communication situation information, information indicating that the kind of the frame is the type mentioned is placed.

In Duration, information regarding the length of the frame is placed. In Receiver Address, information regarding an address of a transmission destination of the frame is placed. For example, in the case where this frame is to be transmitted by broadcasting, a Broadcast Address is placed.

In Transmitter Address, information regarding an address of a transmission source of the frame is placed. In Body, particular information to be transmitted by the frame is placed. For example, Body includes Service Quality Indication Information Element (IE). In FCS (Frame Check Sequence), information regarding error detection and correction is placed.

In Service Quality Indication IE, communication situation information is included. This communication situation information can include, for example, a communication situation in downlink communication of a base station AP and a communication situation in uplink communication of a certain subordinate terminal STA under the base station AP observed by the base station AP.

Service Quality Indication IE includes Throughput, Packet Num, Error Rate, Desired vs. Actual, Measuring Time and Last Action.

In Throughput, information regarding a throughput is included. In Packet Num, information regarding at least one of the number of transmission packets, the number of communication MPDUs, or the number of transmission opportunity acquisitions is included. In Error Rate, information regarding at least one of the number of transmission failures, the number of MPDU transmission failures, or the number of transmission failures for each packet is included. In Desired vs. Actual, information regarding realized communication quality to requested communication quality is included. For example, in Desired vs. Actual, information indicative of a ratio of the realized amount to a request for a throughput or an error rate is included.

In Measuring Time, information regarding a period of time during which a communication situation is observed is included. For example, Measuring Time may be information regarding absolute time or may be an elapsed time period with respect to a frame that is a reference, or else, may be information regarding a period during which observation is performed. In the case where an elapsed time period with respect to a frame that is a reference is placed as Measuring Time, information for identifying the frame to be made the reference may be included. The elapsed time period and the period may be indicated, for example, using a fixed period like the Beacon Interval as a minimum unit.

In Last Action, information regarding control of the detection threshold value and the transmission power performed before transmission of this frame is performed is placed. For example, Last Action may be information regarding determination to carry out the concerned control or may be information regarding the control amount.

It is to be noted that, also in the case where transmission to another base station AP is performed through a subordinate terminal STA, a similar frame format may be used. In this case, into Transmitter Address, information regarding the address of the concerned subordinate terminal STA is placed. Further, in Service Quality Indication IE, information regarding an address of the base station AP that has performed observation may be included.

Figure 11:
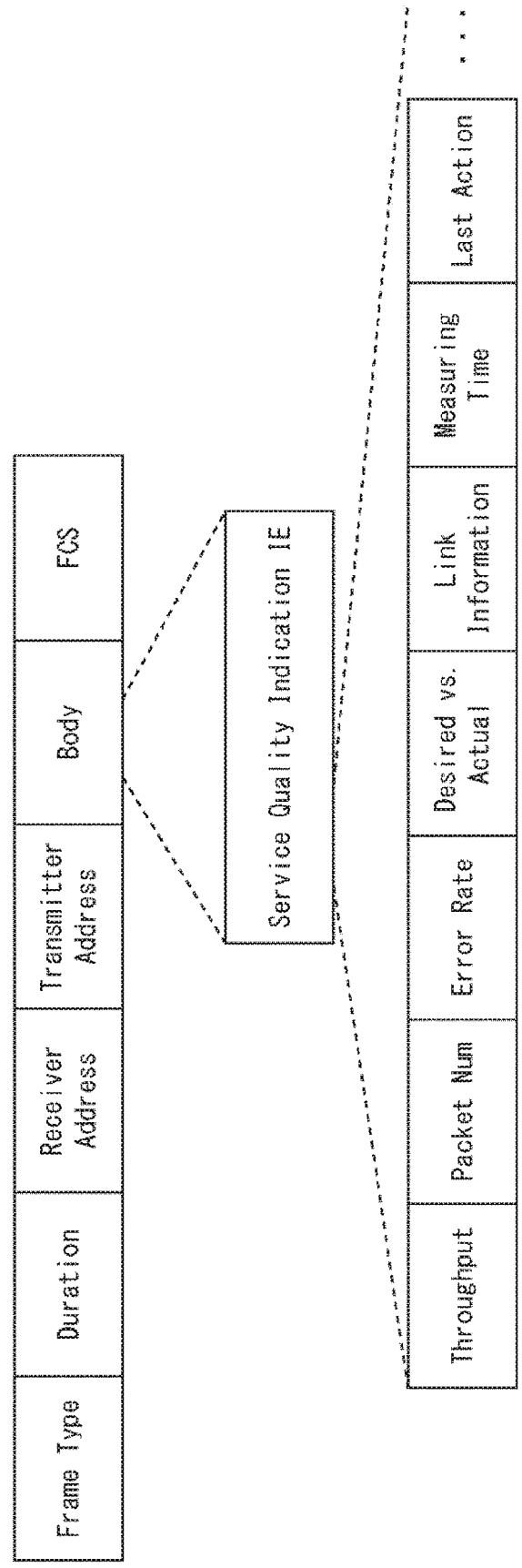
FIG. 11 is a view depicting a second example of a format of a frame in which communication situation information is placed.

Further, as depicted in FIG. 11, Service Quality Indication IE may further include Link Information. In Link Information, information regarding a link through which a communication situation has been observed is included. For example, Link Information may be information regarding an address of a communication source or may be information for the identification between an uplink and a downlink.

It is to be noted that, although, in the foregoing description, own communication situation information and communication situation information of another base station are distinguished from each other for the convenience of description, for any of the communication situation information, the frame format depicted in FIG. 10 or FIG. 11 can be used.

(Example of Format of Frame in which Control Request Information is Placed)

Figure 12:
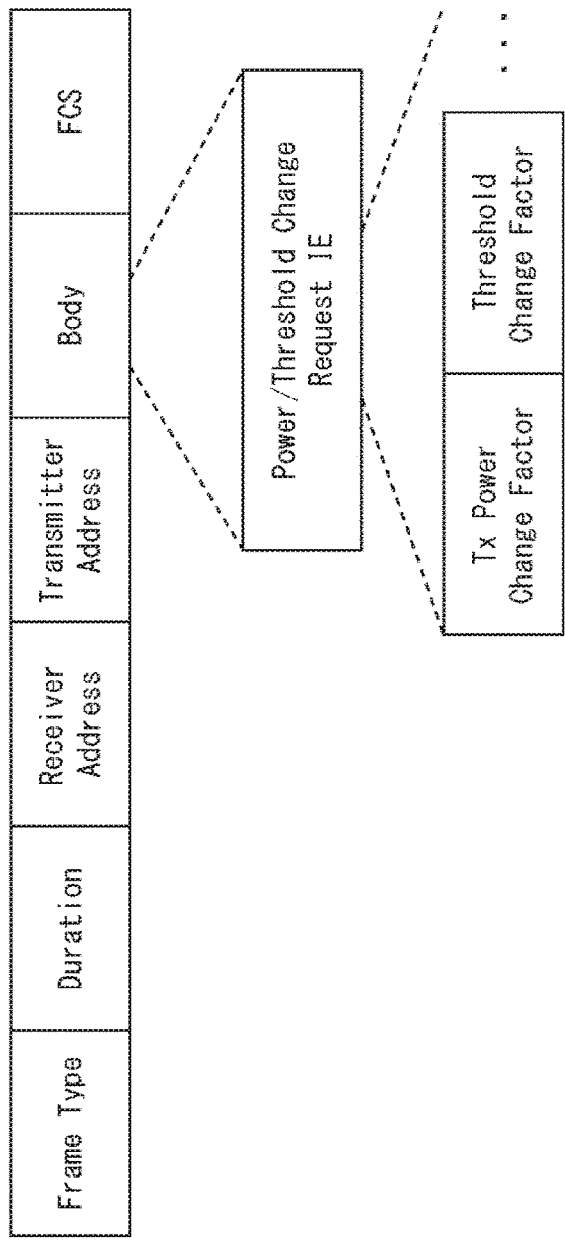
FIG. 12 is a view depicting an example of a format of a frame in which control request information is placed.

FIG. 12 is a view depicting an example of a format of a frame in which control request information is placed.

In FIG. 12, the frame in which control request information is placed includes Frame Type, Duration, Receiver Address, Transmitter Address, Body, and FCS. It is to be noted that Frame Type, Duration, Receiver Address, Transmitter Address, and FCS are similar to those of the frame of FIG. 10 described hereinabove, and therefore, description of them is omitted here.

In Body, particular information to be transmitted by this frame is placed. For example, Body includes Power/Threshold Change Request IE. Power/Threshold Change Request IE includes control request information of a communication parameter. This communication parameter includes, for example, at least one of a detection threshold value or transmission power.

Tx Power Change Factor includes information regarding control of the transmission power. As Tx Power Change Factor, for example, information indicating that control of the transmission power is requested, information regarding a control amount for transmission power, information regarding a parameter for calculating a control amount for transmission power and so forth can be included.

Threshold Change Factor includes information regarding control of the detection threshold value. As Threshold Change Factor, for example, information indicating that control of the detection threshold value is requested, information regarding a control amount for the detection threshold value, information regarding a parameter for calculating a control amount for the detection threshold value and so forth can be included.

Further, the control amount for the detection threshold value may be an interlocking amount with the control amount for the transmission power. Furthermore, in the case where a notification of information regarding a control amount or information regarding a parameter for calculating a control amount is to be transmitted, the information is transmitted together with an identifier of a base station AP that is an adaptation destination of the concerned information. Further, in the case where a plurality of base stations AP that becomes an adaptation destination exists, the concerned information is placed as a plurality of pieces of information according to the number of base stations AP.

It is to be noted that, also in the case where transmission to another base station AP is performed through a subordinate terminal STA, a similar frame format may be used. In this case, in Transmitter Address, information regarding the address of the subordinate terminal STA is placed. Further, in Power/Threshold Change Request IE, information regarding the address of the base station AP by which control request has been performed may be included.

Further, although, in the foregoing description, own control request information and control request information of another base station are distinguished from each other for the convenience of description, for any of the control request information, the frame format depicted in FIG. 12 can be used.

2. Modification (Example of Another Configuration)

In the foregoing description, it is described that, in the communication apparatus 10 (FIG. 2), the control section 101 (FIG. 2) performs control for improving a communication characteristic maintaining the impartiality with an adjacent network BSS including another base station AP and improving a communication characteristic of the entire networks including the own base station AP and another base station AP. However, the function for this control may be had by the communication section 103 configured as a communication module (communication apparatus).

Figure 13:
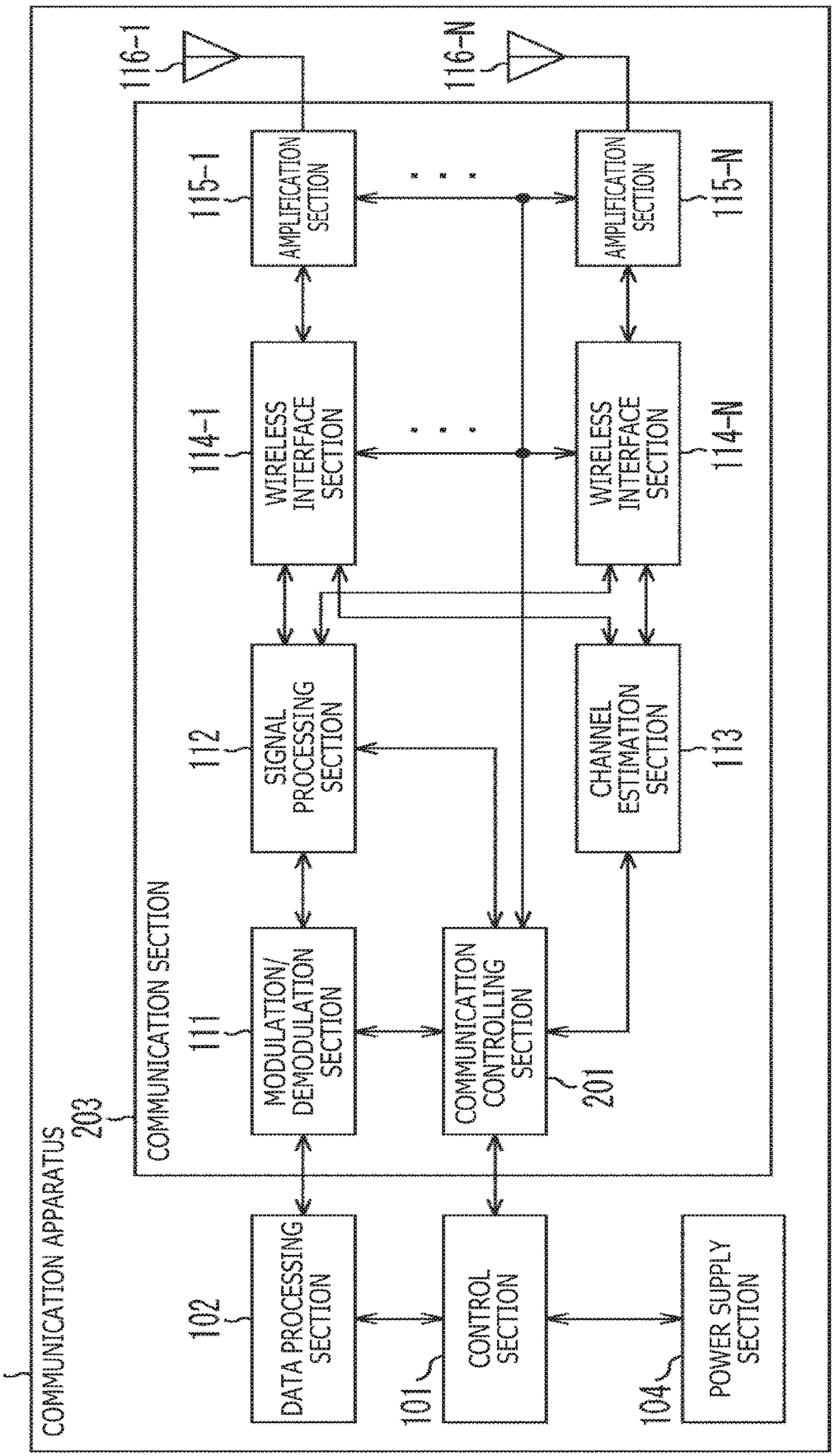
FIG. 13 is a block diagram depicting an example of another configuration of the embodiment of the communication apparatus to which the present technology is applied.

FIGS. 13 and 14 are block diagrams depicting examples of another configuration of an embodiment of a communication apparatus (wireless communication apparatus) to which the present technology is applied.

In FIG. 13, the communication apparatus 20 includes, in comparison with the communication apparatus 10 depicted in FIG. 2, a communication section 203 in place of the communication section 103. The communication section 203 includes a communication controlling section 201 in addition to the modulation/demodulation section 111 to the amplification section 115. The communication controlling section 201 has the function for control for improving a communication characteristic described hereinabove from among the functions of the control section 101 (FIG. 2). It is to be noted that the control section 101 has functions excluding the function for control for improving the communication characteristic described above from among the functions of the control section 101 (FIG. 2).

Meanwhile, in FIG. 14, in comparison with the communication apparatus 10 depicted in FIG. 2, the communication apparatus 30 does not include the control section 101 but includes a communication section 303 in place of the communication section 103. The communication section 303 includes a control section 301 in addition to the modulation/demodulation section 111 to the amplification section 115. The control section 301 has functions similar to those of the control section 101 (FIG. 2) (all functions including the function for control for improving a communication characteristic described above).

It is to be noted that the communication apparatus 10, the communication apparatus 20, and the communication apparatus 30 may be configured as part of an apparatus that configures a base station AP or a subordinate terminal STA.

Further, in the description given above, the communication may naturally be wireless communication or wired communication or may be communication in which both wireless communication and wired communication are included mixedly such that wireless communication is performed within a certain section while wired communication is performed within another section. Furthermore, communication from a certain apparatus to another apparatus may be performed by wired communication while communication from the other apparatus to the certain apparatus is performed by wireless communication.

It is to be noted that the embodiment of the present technology is not limited to the embodiment described above but allows various alterations without departing from the subject matter of the present technology.

Further, the present technology can take such a configuration as described below.

(1)

A communication apparatus that is a base station, the communication apparatus including:

a control section configured to determine, on the basis of first communication situation information regarding a communication situation of the base station and second communication situation information regarding a communication situation received from another base station, whether or not it is permissible to carry out control of a communication parameter in the base station, and determine, on the basis of the first communication situation information and the second communication situation information, whether or not it is permissible to transmit first control request information regarding a control request of a communication parameter in the another base station.

(2)

The communication apparatus according to (1) above, in which the communication parameter includes at least one of a detection threshold value or transmission power.

(3)

The communication apparatus according to (1) or (2) above, in which the control section carries out control of a communication parameter in the base station on the basis of a result of the determination of whether or not it is permissible to carry out the control.

(4)

The communication apparatus according to any one of (1) to (3) above, in which the control section performs control for transmitting the first communication situation information to the another base station.

(5)

The communication apparatus according to any one of (1) to (4) above, in which the first communication situation information includes at least one of a throughput, the number of transmission opportunity acquisitions, the number of transmission failures, information regarding realized communication quality with respect to requested communication quality, information regarding a period of time during which a communication situation is observed, or information regarding control performed before transmission.

(6)

The communication apparatus according to any one of (1) to (5) above, in which the control section carries out control of a communication parameter in the base station on the basis of second control request information regarding a control request of a communication parameter in the base station received from the another base station.

(7)

The communication apparatus according to any one of (1) to (6) above, in which the control section determines whether or not it is permissible to carry out control of a communication parameter in the base station on the basis of the first communication situation information and a result of comparison between a first index calculated from the second communication situation information and a first threshold value.

(8)

The communication apparatus according to any one of (1) to (7) above, in which the control section performs control for transmitting, on the basis of a result of the determination of whether or not it is permissible to carry out control, second control request information regarding a control request of a communication parameter in the base station to a subordinate terminal of the base station.

(9)

The communication apparatus according to any one of (1) to (7) above, in which the control section performs control for transmitting second control request information regarding a control request of a communication parameter in the base station, the second control request information being received from the another base station, to a subordinate terminal of the base station.

(10)

The communication apparatus according to (2) above, in which the control section determines whether or not it is permissible to transmit the first control request information on the basis of the first communication situation information and a result of comparison between a second index calculated from the second communication situation information and a second threshold value.

(11)

The communication apparatus according to (10) above, in which, in a case where the first control request information includes the detection threshold value as the communication parameter, the first control request information includes at least one of information indicating that control of the detection threshold value is requested, information regarding a control amount for the detection threshold value, or information regarding a parameter for calculating the control amount for the detection threshold value.

(12)

The communication apparatus according to (10) or (11) above, in which, in a case where the first control request information includes the transmission power as the communication parameter, the first control request information includes at least one of information indicating that control of the transmission power is requested, information regarding a control amount for the transmission power, or information regarding a parameter for calculating the control amount for the transmission power.

(13)

The communication apparatus according to (6) above, in which the control section corrects, in a case where the second control request information is received from a plurality of the other base stations, the second control request information received later in time, and carries out control of a communication parameter in the base station on the basis of the corrected second control request information.

(14)

The communication apparatus according to any one of (1) to (13) above, in which the second communication situation information includes at least one of a throughput, the number of transmission opportunity acquisitions, the number of transmission failures, information regarding realized communication quality with respect to requested communication quality, information regarding a period of time during which a communication situation is observed, or information regarding control performed before transmission.

(15)

A communication method performed by a communication apparatus of a base station, the communication method including:

determining, on the basis of first communication situation information regarding a communication situation of the base station and second communication situation information regarding a communication situation received from another base station, whether or not it is permissible to carry out control of a communication parameter in the base station; and determining, on the basis of the first communication situation information and the second communication situation information, whether or not it is permissible to transmit first control request information regarding a control request of a communication parameter in the another base station.

(16)

A communication apparatus that is a subordinate terminal connected to a base station, the communication apparatus including:

a control section that carries out control of a communication parameter of the subordinate terminal on the basis of control request information regarding a control request of a communication parameter in the base station received from the base station, in which the control request information is information based on first communication situation information regarding a communication situation of the base station and second communication situation information regarding a communication situation of another base station.

(17)

The communication apparatus according to (16) above, in which the communication parameter includes at least one of a detection threshold value or transmission power.

(18)

The communication apparatus according to (16) or (17) above, in which the control section performs control for notifying the base station that the communication apparatus corresponds to a function for carrying out control of the communication parameter.

(19)

The communication apparatus according to any one of (16) to (18) above, in which
the control section performs control for transmitting the first communication situation information or the control request information received from the base station to the another base station.

(20)

A communication method performed by a communication apparatus of a subordinate terminal connected to a base station, the communication method including:
carrying out control of a communication parameter of the subordinate terminal on the basis of control request information that is information regarding a control request of a communication parameter in the base station received from the base station and is based on first communication situation information regarding a communication situation of the base station and second communication situation information regarding a communication situation of another base station.

REFERENCE SIGNS LIST 10, 20, 30 Communication apparatus, 101 Control section, 102 Data processing section, 103 Communication section, 104 Power supply section, 111 Modulation/demodulation section, 112 Signal processing section, 113 Channel estimation section, 114, 114-1 to 114-N Wireless interface section, 115, 115-1 to 115-N Amplification section, 116, 116-1 to 116-N Antenna, 201 Communication controlling section, 203 Communication section, 301 Control section, 303 Communication section, AP Base station, BSS Network, STA Subordinate terminal

The invention claimed is:

1. A communication apparatus comprising:
a control section configured to:
determine, based on a result of a comparison between a first index and a first threshold value, whether control of a communication parameter in a first base station is permissible, wherein
the first index is calculated from first communication situation information regarding a communication situation of the first base station and second communication situation information regarding a communication situation received from a second base station, and
the communication apparatus is the first base station; and
determine, based on the first communication situation information and the second communication situation information, whether transmission of first control request information regarding a control request of a communication parameter in the second base station is permissible.

2. The communication apparatus according to claim 1, wherein the communication parameter includes at least one of a detection threshold value or transmission power.

3. The communication apparatus according to claim 2, wherein
the control section is further configured to determine, based on a result of comparison between a second index and a second threshold value, whether the transmission of the first control request information is permissible, and
the second index is calculated from the first communication situation information and the second communication situation information.

4. The communication apparatus according to claim 3, wherein,
in a case where the first control request information includes the detection threshold value as the communication parameter, the first control request information includes at least one of information indicating that control of the detection threshold value is requested, information regarding a control amount for the detection threshold value, or information regarding a parameter for calculation of the control amount for the detection threshold value.

5. The communication apparatus according to claim 3, wherein,
in a case where the first control request information includes the transmission power as the communication parameter, the first control request information includes at least one of information indicating that control of the transmission power is requested, information regarding a control amount for the transmission power, or information regarding a parameter for calculation of the control amount for the transmission power.

6. The communication apparatus according to claim 1, wherein
the control section is further configured to control the communication parameter in the first base station based on a result of the determination of whether the control of the communication parameter in the first base station is permissible.

7. The communication apparatus according to claim 1, wherein
the control section is further configured to transmit the first communication situation information to the second base station.

8. The communication apparatus according to claim 7, wherein
the first communication situation information includes at least one of a throughput, a number of transmission opportunity acquisitions, a number of transmission failures, information regarding realized communication quality with respect to requested communication quality, information regarding a period of time during which the communication situation is observed, or information regarding control performed before the transmission.

9. The communication apparatus according to claim 1, wherein
the control section is further configured to control the communication parameter in the first base station based on second control request information regarding a control request of the communication parameter in the first base station received from the second base station.

10. The communication apparatus according to claim 9, wherein the control section is further configured to:
correct the second control request information received later in time, wherein
the second control request information is received from a plurality of base stations; and
control the communication parameter in the first base station based on the corrected second control request information.

11. The communication apparatus according to claim 1, wherein
the control section is further configured to transmit, based on a result of the determination of whether the control of the communication parameter is permissible, second control request information regarding a control request of the communication parameter in the first base station to a subordinate terminal of the first base station.

12. The communication apparatus according to claim 1, wherein
the control section is further configured to transmit second control request information regarding a control request of the communication parameter in the first base station to a subordinate terminal of the first base station, and
the second control request information is received from the second base station.

13. The communication apparatus according to claim 1, wherein
the second communication situation information includes at least one of a throughput, a number of transmission opportunity acquisitions, a number of transmission failures, information regarding realized communication quality with respect to requested communication quality, information regarding a period of time during which the communication situation is observed, or information regarding control performed before the transmission.

14. A communication method comprising:
determining, based on a result of comparison between a first index and a first threshold value, whether control of a communication parameter in a first base station is permissible, wherein
the first index is calculated from first communication situation information regarding a communication situation of the first base station and second communication situation information regarding a communication situation received from a second base station; and
determining, based on the first communication situation information and the second communication situation information, whether transmission of first control request information regarding a control request of a communication parameter in the second base station is permissible.

15. A communication apparatus, comprising:
a control section configured to control a communication parameter of a subordinate terminal based on control request information regarding a control request of a communication parameter in a first base station received from the first base station, wherein
the control request information is based on a determination of whether control of the communication parameter in the first base station is permissible,
the determination is based on a result of a comparison between a first index and a first threshold value,
the first index is calculated from first communication situation information regarding a communication situation of the first base station and second communication situation information regarding a communication situation of a second base station, and
the communication apparatus is the subordinate terminal that is connected to the first base station.

16. The communication apparatus according to claim 15, wherein the communication parameter includes at least one of a detection threshold value or transmission power.

17. The communication apparatus according to claim 15, wherein the control section is further configured to notify the first base station that the communication apparatus corresponds to a function to execute the control of the communication parameter.

18. The communication apparatus according to claim 15, wherein the control section is further configured to transmit one of the first communication situation information or the control request information received from the first base station to the second base station.

19. A communication method comprising:
in a subordinate terminal connected to a first base station:
controlling a communication parameter of the subordinate terminal based on a control request information regarding a control request of a communication parameter in the first base station received from the first base station, wherein
the control request information is based on a determination of whether control of the communication parameter in the first base station is permissible,
the determination is based on a result of a comparison between a first index and a first threshold value, and
the first index is calculated from first communication situation information regarding a communication situation of the first base station and second communication situation information regarding a communication situation of a second base station.

* * * * *